US008094132B1

(12) United States Patent  (10) Patent No.: US 8,094,132 B1
Frischling et al.  (45) Date of Patent: Jan. 10, 2012

(54) IMAGE DISPLAY TOUCH CONTROL

(75) Inventors: William S. Frischling, Great Falls, VA (US); Thomas Dellecave, Ashburn, VA (US); Jennifer L. Canty, Great Falls, VA (US); Ja Young Seo, Bethesda, MD (US)

(73) Assignee: Cagle, L.L.C., Sterling, VA (US)

( * ) Notice: Subject to any disclaimer, the term of this patent is extended or adjusted under 35 U.S.C. 154(b) by 438 days.

(21) Appl. No.: 12/427,544

(22) Filed: Apr. 21, 2009

Related U.S. Application Data

(60) Provisional application No. 61/046,647, filed on Apr. 21, 2008.

(51) Int. Cl.
*G09G 5/00* (2006.01)
(52) U.S. Cl. .................. 345/173; 178/18.01
(58) Field of Classification Search .......... 345/156, 345/169, 173; 715/701–702, 716; 178/18.01; 341/34; 368/69; 463/30; 235/472.01
See application file for complete search history.

(56) References Cited

U.S. PATENT DOCUMENTS

| D500,601 S | 1/2005 | Shehu |
|---|---|---|
| 6,975,308 B1 | 12/2005 | Bitetto et al. |
| 7,107,605 B2 | 9/2006 | Janik |
| 7,656,393 B2 * | 2/2010 | King et al. ............ 345/173 |
| 2002/0126150 A1 | 9/2002 | Parry |
| 2003/0095152 A1 | 5/2003 | Fong |
| 2004/0257348 A1 | 12/2004 | Ou |
| 2005/0012758 A1 | 1/2005 | Christou |
| 2005/0162711 A1 | 7/2005 | Wu |
| 2005/0226593 A1 | 10/2005 | Glassman et al. |
| 2006/0170669 A1 | 8/2006 | Walker et al. |

* cited by examiner

*Primary Examiner* — Abbas Abdulselam
(74) *Attorney, Agent, or Firm* — Fish & Richardson P.C.

(57) ABSTRACT

An operator of an image display device can control operation of an application and/or functionality of the image display device using a touch sensitive area located around the display of the image display device. The touch sensitive area, such as a matte, can be divided into one or more regions.

20 Claims, 20 Drawing Sheets

IMAGE DISPLAY TOUCH CONTROL

CROSS-REFERENCE TO RELATED APPLICATION

This application claims priority to U.S. Provisional Patent Application Ser. No. 61/046,647 filed Apr. 21, 2008, and entitled "Digital Picture Frame," the contents of which are incorporated herein by reference.

TECHNICAL FIELD

This invention generally relates to image display devices, and more particularly relates to touch control of an image display device.

BACKGROUND

The increased popularity of digital cameras has corresponded to an increased demand for image display devices, such as digital picture frames. Digital picture frames display one or more electronic images, such as photographs, paintings, and other artistic creations. Digital pictures frames typically include a display and a support structure that allows the digital picture frame to be free-standing or hung on a wall. A bezel or border is provided around the display for ornamental purposes and to protect the display. An operator can control the functions of a typical digital picture frame using buttons located on the bezel or on the support structure of the frame.

SUMMARY

An operator of an image display device can control operation of an application and/or functionality of the image display device using a touch sensitive area located around the display of the image display device. The touch sensitive area, such as a matte, can be divided into one or more regions.

In some implementations, the image display device comprises a display configured to render an image and an identifier of a functionality, a matte having two or more regions that are touch sensitive surrounding the display, and a processor. The processor can be configured to enable presentation of the image on the display and receive a first indication that at least one of the two or more regions of the matte have been touched. In response to reception of the first indication that the at least one of the two or more regions of the matte have been touched, the processor can be configured to associate one of the two or more regions of the matte with a first functionality associated with subsequent interaction with the matte, and enable presentation of an identifier of the first functionality associated with subsequent interaction with the matte overlaid on the image on the display. In addition, the processor can be enabled to receive a second indication that the one region of the matte associated with the first functionality has been touched. In response to reception of the second indication that the one region of the matte associated with the first functionality has been touched, the processor can be configured to perform a function associated with the first functionality, associate the one region of the matte with a second functionality associated with subsequent interaction with the matte that is different from the first functionality, and enable presentation of an identifier of the second functionality associated with subsequent interaction with the matte overlaid on the image on the display.

In some implementations, the image display device comprises comprises a display configured to render an image and an identifier of a functionality, a matte having two or more regions that are touch sensitive surrounding the display, and a processor. The processor can be configured enable presentation of the image on the display, and receive an indication that at least one of the two or more regions of the matte have been touched. In response to reception of the indication that the at least one of the two or more regions of the matte have been touched, the processor can be enable presentation of an identifier of a functionality associated with subsequent interaction with the matte overlaid on the image on the display.

In some implementations, the image display device can be controlled by an operator. Presentation of an image on a display is enabled. A first indication that an operator has touched at least one of two or more regions of a touch sensitive area surrounding the display is received at a first time. In response to reception of the first indication that the at least one of the two or more regions of the touch sensitive area have been touched, presentation of an identifier of a first functionality overlaid on the image on the display is enabled. A second indication that the operator has touched at least one of the two or more regions of the touch sensitive area is received at a second time that is after the first time. In response to reception of the second indication that the at least one of the two or more regions of the touch sensitive area have been touched, presentation of an identifier of a second functionality overlaid on the image on the display is enabled, where the second functionality is different than the first functionality.

Details of one or more implementations are set forth in the accompanying drawings and the description below. Other aspects can be implemented in systems will be apparent from the description and drawings, and from the claims.

DESCRIPTION OF DRAWINGS

Like reference symbols indicate like elements throughout the specification and drawings.

DETAILED DESCRIPTION

Techniques, methods, apparatus, and computer program products for touch control of an image display device, such as a digital picture frame, are described. An operator of a digital picture frame can control operation of an application and/or functionality of the digital picture frame using a touch sensitive area located around the display of the digital picture frame. The touch sensitive area, such as a matte, can completely surround the display of the digital picture frame and can be divided into one or more regions, as described in greater detail below.

Figure 1:
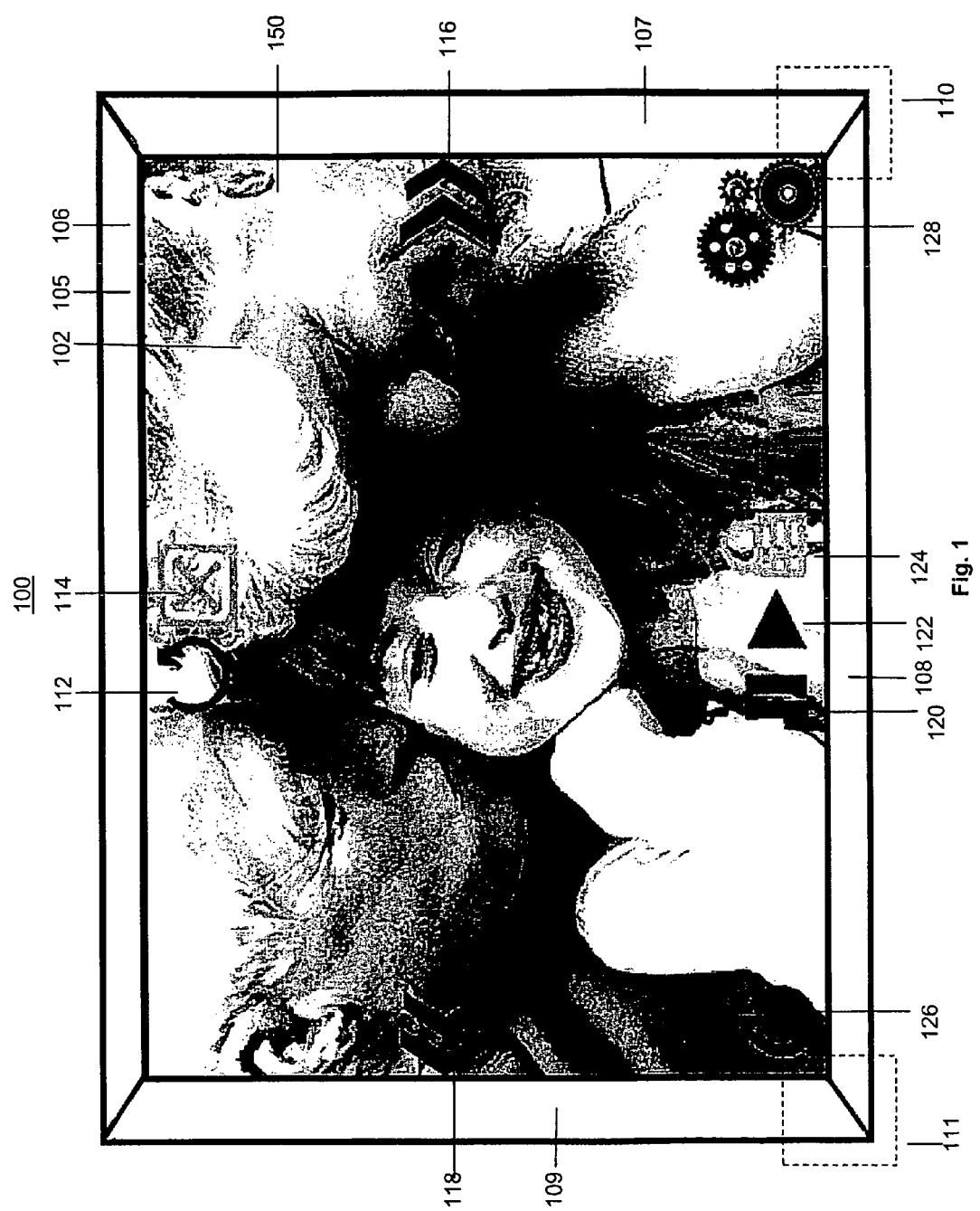
FIG. 1 is an illustration of an example of an initial functionality graphical user interface (GUI).
Figure 17:
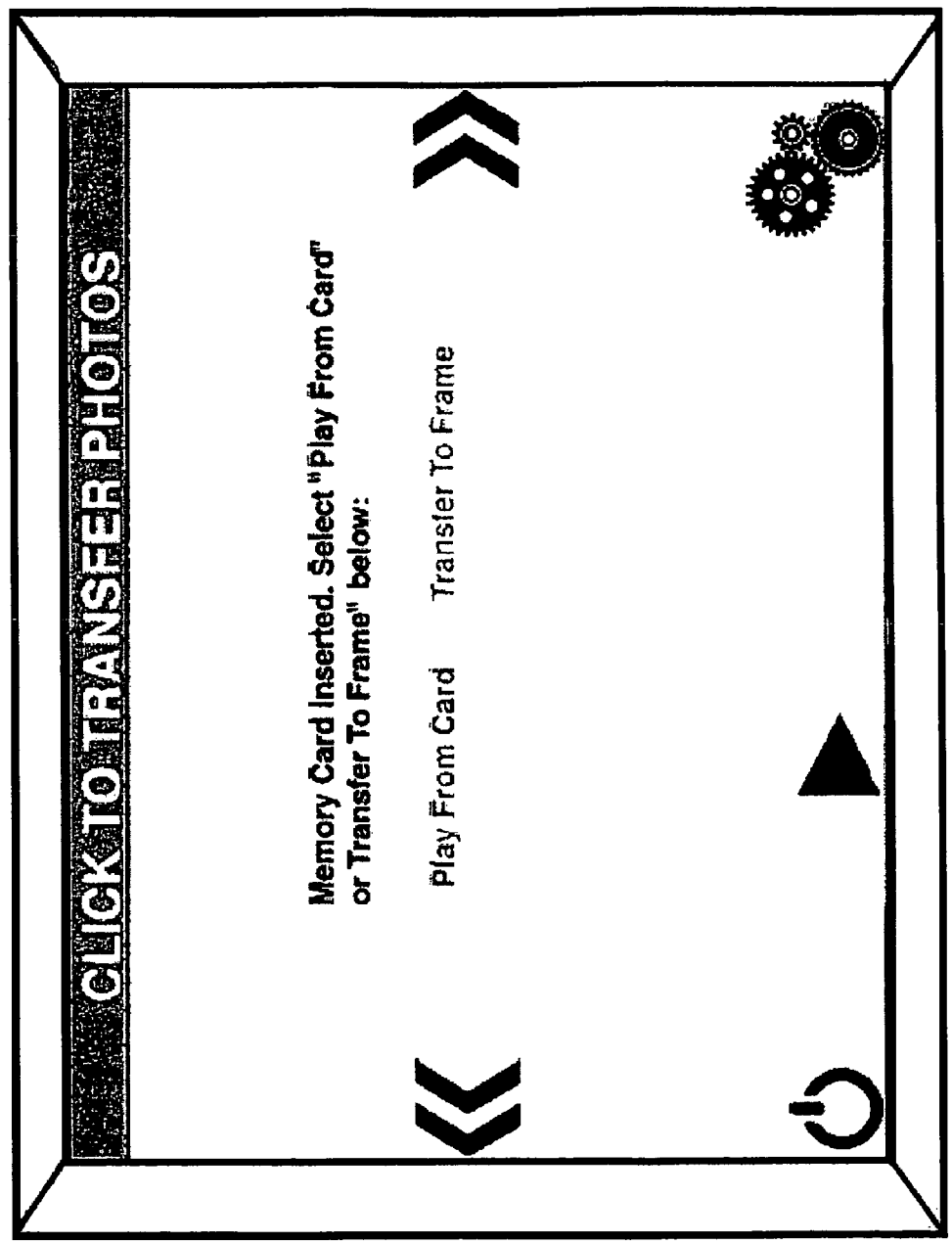
FIG. 17 is an illustration of an example of a transfer GUI.

FIG. 1 is an illustration of an example of an initial functionality graphical user interface (GUI) 100 shown on a display 150 of a digital picture frame. The display 150 renders an image, such as a picture 102, received from a network, received from another device, stored internally in memory, and/or stored on a memory card. In some implementations, when an operator of the digital picture frame inserts a memory card that stores images into a memory card reader of the digital picture frame, the digital picture frame will automatically (i.e., without human interaction) start to consecutively render the images stored on the memory card on the display 150. In some implementations, the operator of the digital picture frame can select to transfer the images stored on the memory card to an internal memory of the digital picture frame before the images are rendered on the display 150, as described in greater detail in connection with FIG. 17.

The images can be rendered in several different orders, such as, by image file name, by folder, by date an image was created, by date an image was loaded into an internal memory of the digital picture frame, and/or by a date range assigned by an operator of the digital picture frame. In some implementations, all of the images received by the digital picture frame can be rendered, while in other implementations only a subset of the images can be rendered. For example, the subset of images can be selected according to a specified date range, as described in greater detail below. In another example, the individual images to be rendered can be selected by the operator, as also described in greater detail below.

A touch sensitive area 105 surrounds the display 150. The touch sensitive area 105 can completely surround the display 150, as illustrated in FIG. 1, or can partially surround the display 150. For example, a matte can completely surround the display 150 and a portion, such as only two sides, of the matte can be touch sensitive. The touch sensitive area 105 can be divided into one or more regions. For example, as illustrated in FIG. 1, each side of the touch sensitive area 105 is a separate region, such that the touch sensitive area 105 includes four regions: top region 106, right region 107, bottom region 108, and left region 109.

In some implementations, each side of the touch sensitive area 105 can include multiple equally or differently sized regions. In some implementations, the corners of the touch sensitive area 105 can be separate regions, such that the top-right corner, bottom-right corner 110, bottom-left corner 111, and top-left corner are each separate regions. In other implementations, the corners of the touch sensitive area 105 can include portions of two different regions. For example, the bottom-right corner 110 can include portions of the right region 107 and the bottom region 108, such that if an operator touches the bottom-right corner 110, the operator has touched both the right region 107 and the bottom region 108. Similarly, the bottom-left corner 111 can include portions of the bottom region 108 and the left region 109, such that if an operator touches the bottom-left corner 111, the operator has touched both the bottom region 108 and the left region 109.

An operator of the digital picture frame can touch any portion of the touch sensitive area 105 to initiate control of the digital picture frame. For example, as illustrated by the initial functionality GUI 100, touching any portion of the touch sensitive area 105 can cause presentation of identifiers (i.e., icons) of various functions and an application of the digital picture frame over an image being displayed on the display 150. For example, the rotation icon 112 represents the function of rotating the image over which the icons are being displayed. The deletion icon 114 represents the function of deleting the image over which the icons are being displayed.

Figure 2:
FIG. 2 is an illustration of an example of a rotation GUI.

The top region 106 of the touch sensitive area 105 is associated with the functions of rotating and deleting an image, such that an operator of the digital picture frame can choose to rotate and/or delete an image by touching the top region 106. For example, if an operator briefly touches (e.g., taps) the top region 106, the image being displayed can be rotated 90-degrees counter clockwise, as illustrated in rotation GUI 200 in FIG. 2. In some implementations, the image can be rotated 90-degrees clockwise or 180-degrees in response to the operator tapping the top region 106. In addition, the rotated version of the image can be stored in memory, such that the next time the image is rendered, it will be automatically rotated.

Figure 3:
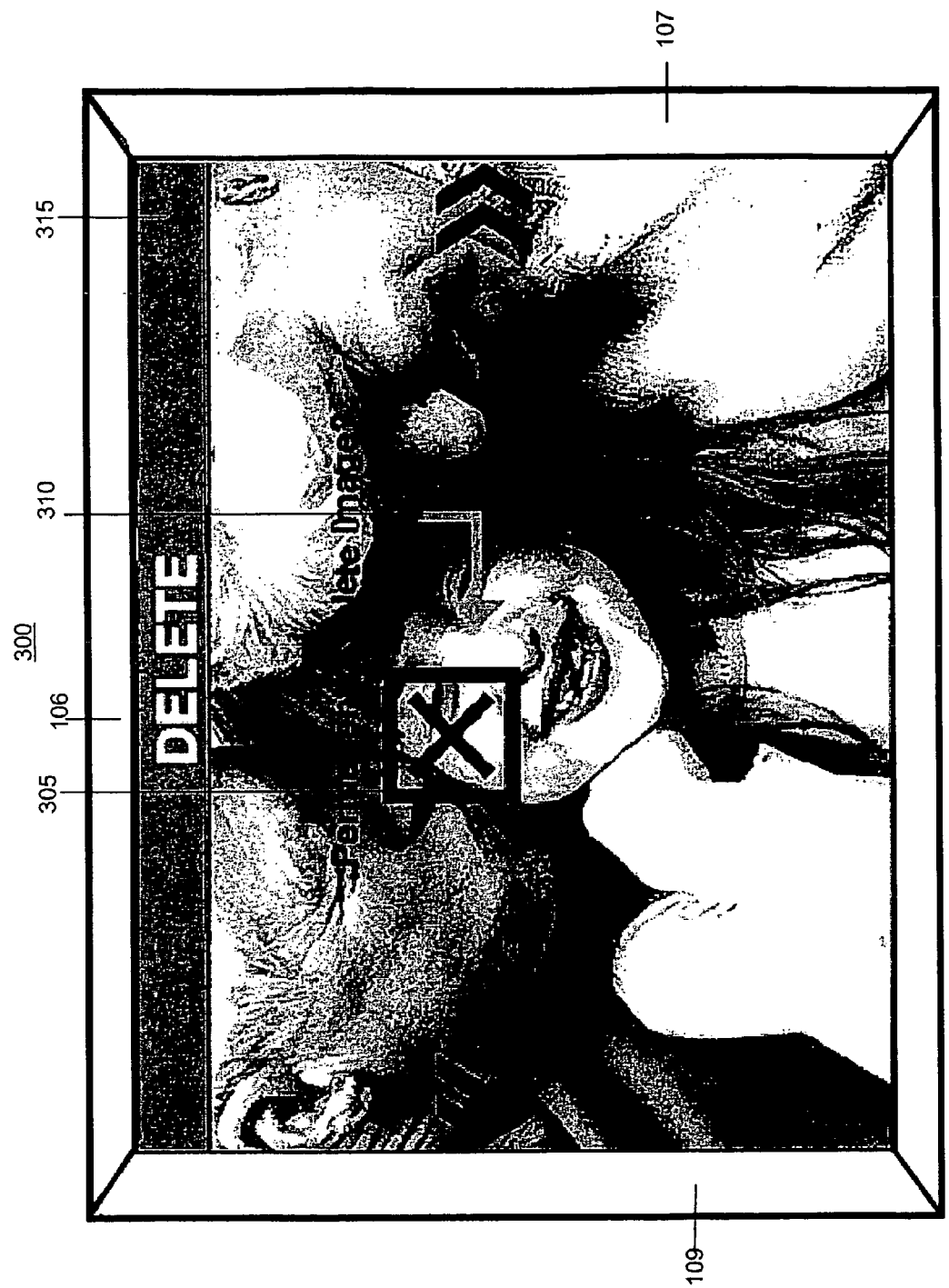
FIG. 3 is an illustration of an example of an image deletion GUI.

If the operator uninterruptedly touches the top region 106 for greater than a predetermined amount of time, such as, for example, two seconds, the image being displayed can be deleted. In some implementations, an image deletion GUI 300 is presented to the operator to confirm deletion of the image before the image is deleted, as illustrated in FIG. 3. The image deletion GUI 300 includes deletion icon 305, cancel icon 310, and text area 315. The deletion icon 305 can be the same as or different from the deletion icon 114. In some implementations, instead of deletion icon 305 and cancel icon 310, the GUI can present the text "Yes" and "No," respectively. The operator can toggle between icons 305 and 310 by touching the left region 109 and/or the right region 107. The selected icon can be visually distinguished from the other icon by, for example, changing the size and/or color of the selected icon. In addition, a description of the function corresponding to the selected icon can be displayed in text area 315. For example, image deletion GUI 300 shows that the operator has selected the deletion icon 305 and "DELETE" is shown in the text area 315. By touching the top region 106, the operator can confirm deletion of the image being displayed and, in response, the image is deleted from memory. In other implementations, the image can be deleted without confirmation of the deletion and, therefore, GUI 300 will not be presented to the operator.

Returning to the initial functionality GUI 100, the next image icon 116 represents the function of rendering another image stored in memory. The previous image icon 118 represents the function of rendering an image that was rendered immediately before the image currently being rendered on the display 150. The right region 107 of the touch sensitive area 105 is associated with the function of rendering the next image, such that the operator can choose to view the next image by touching the right region 107. The left region 109 is associated with the function of rendering the previous image, such that the operator can choose to view the previous image by touching the left region 106.

If the operator briefly touches the right region 107 or the left region 109, the image immediately following or immediately preceding the image being displayed is rendered. In addition, if the operator uninterruptedly touches the right region 107 or the left region 109 for greater than a predetermined amount of time, such as, for example, two seconds, multiple next or previous images can be consecutively rendered according to a predetermined time interval, such as, for example, 250 milliseconds, until the operator stops touching the touch sensitive area 105. The identifiers of the various functions and application of the digital picture frame are not changed as the operator touches the right region 107 or the left region 109 to view different images.

The pause icon 120 represents the function of pausing the consecutive display of images (i.e., pausing an image slideshow) on the display 150. The play icon 122 represents a function of resuming the consecutive display of images on the display 150. The lock icon 124 represents the function of securing the image against alteration and/or deletion. The bottom region 108 of the touch sensitive area 105 is associated with the functions of pausing and resuming the rending of images, and locking an image. For example, if the operator briefly touches the bottom region 108 while the display 150 is consecutively rendering images, the consecutive rendering of images will be paused. In another example, if the operator briefly touches the bottom region 108 while the rendering of images is paused, the consecutive rendering of images will be resumed.

In addition, if the operator uninterruptedly touches the bottom region 108 for greater than a predetermined amount of time, such as, for example, two seconds, the image will be locked and alteration and/or deletion of the image will be restricted. An indication that the image has been locked can be saved in memory. The consecutive rendering of images will be paused while the operator is uninterruptedly touching the bottom region 108 to lock the image.

Although the pause icon 120, play icon 122, and lock icon 124 are all displayed in the initial functionality GUI 100, in some implementations, only one or two of the three icons 120, 122, and 124 can be displayed at the same time. For example, while the display 150 is consecutively rendering images, only the pause icon 120 can be displayed. In this example, the bottom region 108 of the touch sensitive area 105 is associated only with the function of pausing the consecutive rendering of image. Then, after the operator chooses to pause the consecutive rendering of images, only the play icon 122 can be displayed, and the bottom region 108 of the touch sensitive area 105 is associated only with the function of resuming the consecutive rendering of image. In some implementations, the lock icon 124 can also be displayed when the pause icon 120 is displayed and/or when the play icon 122 is displayed.

The power off icon 126 represents the function of turning off the digital picture frame. In some implementations where the bottom-left corner 111 includes portions of the bottom region 108 and the left region 109, the bottom region 108 and the left region 109 are both associated with the function of turning off the digital picture frame. The digital picture frame is turned off in response to the operator simultaneously touching portions of both the bottom region 108 and the left region 109, such as by touching the ends of the bottom region 108 and the left region 109 that make up the bottom-left corner 111. In other implementations where the bottom-left corner 111 is a separate touch sensitive region, the bottom-left corner region is associated with turning off the digital picture frame.

In some implementations, the operator may be required to uninterruptedly touch the bottom-left corner 111 for greater than a predetermined amount of time, such as, for example, two seconds, to turn the digital picture frame off. In addition, the operator may be presented with a power down confirmation GUI to confirm that the digital picture frame should be turned off.

The settings icon 128 represents the function of accessing an application to select images and/or adjust the settings of the digital picture frame. In some implementations where the bottom-right corner 110 includes portions of the right region 107 and the bottom region 108, both the right region 107 and the bottom region 108 are associated with the function of accessing the settings application. The settings application is accessed in response to the operator simultaneously touching portions of both the right region 106 and the bottom region 108, such as by touching the ends of the right region 106 and the bottom region 108 that make up the bottom-right corner 110. In other implementations where the bottom-right corner 110 is a separate touch sensitive region, the bottom-right corner region is associated with accessing the setting application. In some implementations, the operator may be required to uninterruptedly touch the bottom-right corner 110 for greater than a predetermined amount of time, such as, for example, two seconds, to access the settings application.

Figure 4:
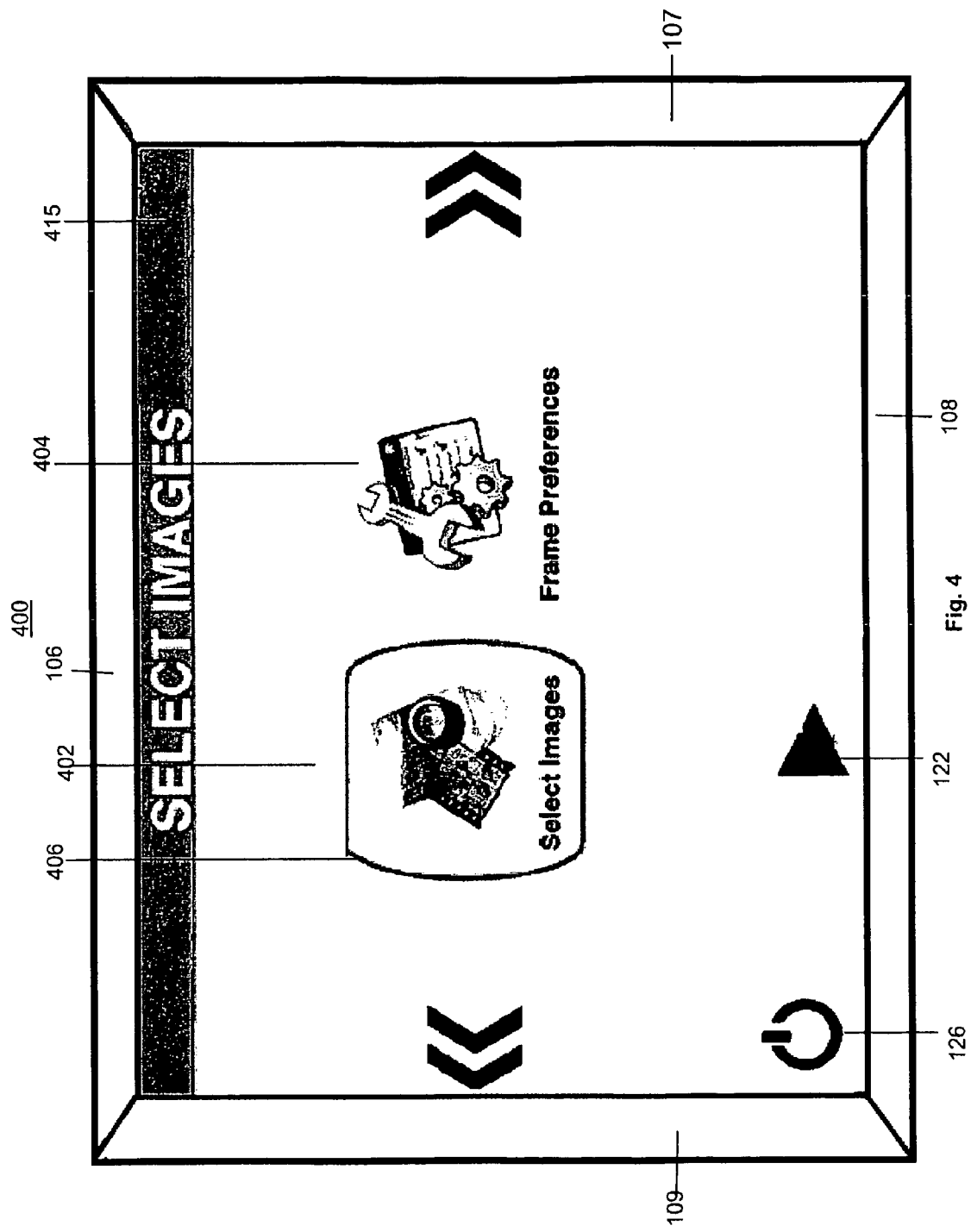
FIG. 4 is an illustration of an example of an initial settings GUI.

In response to the operator selecting the settings icon 128 by touching the bottom-right corner 110, the initial settings GUI 400 is presented to the operator on the display 150, as illustrated in FIG. 4. The image selection icon 402 represents the function of enabling the operator to select images to be rendered on the display 150. The frame preferences icon 404 represents the function of enabling the operator to access and modify the settings of the digital picture frame.

The operator can toggle between icons 402 and 404 by touching the left region 109 and/or the right region 107. The selected icon can be visually distinguished from the other icon by, for example, changing the size and/or color of the selected icon, and/or drawing a border 406 around the selected icon. In addition, a description of the function corresponding to the selected icon can be displayed in text area 415. For example, the initial settings GUI 400 shows that the operator has selected the image selection icon 402 and "SELECT IMAGES" is shown in the text area 415. By touching the top region 106, the operator can select that the function associated with the selected icon be performed.

The play icon 122 displayed in GUI 400 represents the function of resuming the consecutive display of images on the display 150 and is associated with the bottom region 108. By touching the bottom region 108, the operator can exit the initial settings GUI 400 and the display 150 will resume the consecutive rendering of images. The power off icon 126 represents the function of turning off the digital picture frame.

Figure 5:
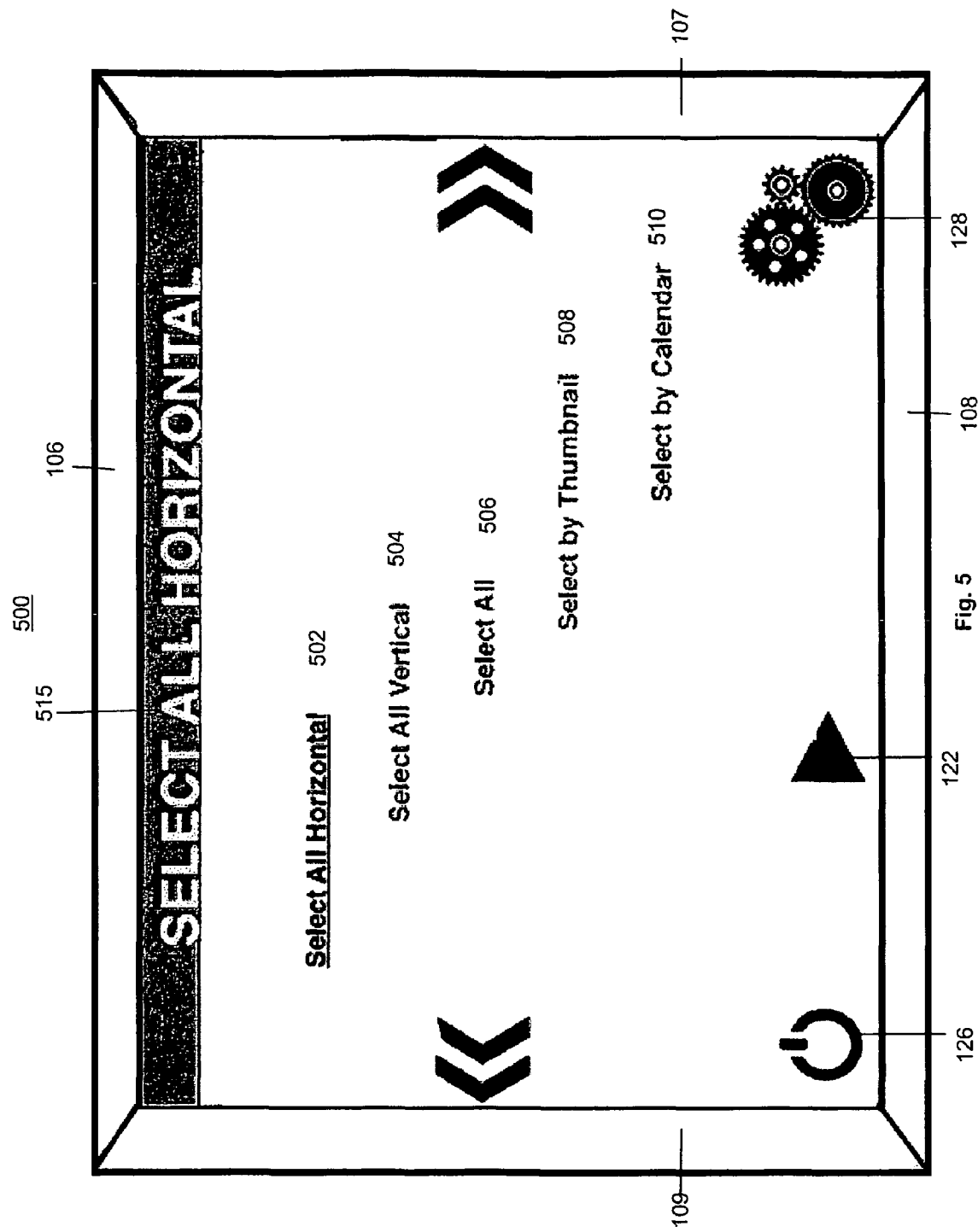
FIG. 5 is an illustration of an example of an image selection GUI.

In response to the operator selecting the image selection icon 402, image selection GUI 500 is presented to the operator on display 150, as illustrated in FIG. 5. The image selection GUI 500 includes the option 502 to select all images that have a horizontal orientation, option 504 to select all images that have a vertical orientation, option 506 to select all images, option 508 to enable the operator to select images by viewing thumbnails of the images, and option 510 to enable the operator to select images by date. The operator can toggle between options 502-510 by touching the left region 109 and/or the right region 107. The selected option can be visually distinguished from the other options by, for example, changing the font, size, and/or color of the selected option. In addition, a description of the function corresponding to the selected option can be displayed in text area 515. For example, image selection GUI 500 shows that the operator has selected the option 502 and "SELECT ALL HORIZONTAL" is shown in the text area 515. By touching the top region 106, the operator can select that the function associated with the selected option be performed.

The play icon 122, power off icon 126, and settings icon 128 are also included in the image selection GUI 500. By selecting the settings icon 128, the operator is returned to the initial settings GUI 400.

Figure 6:
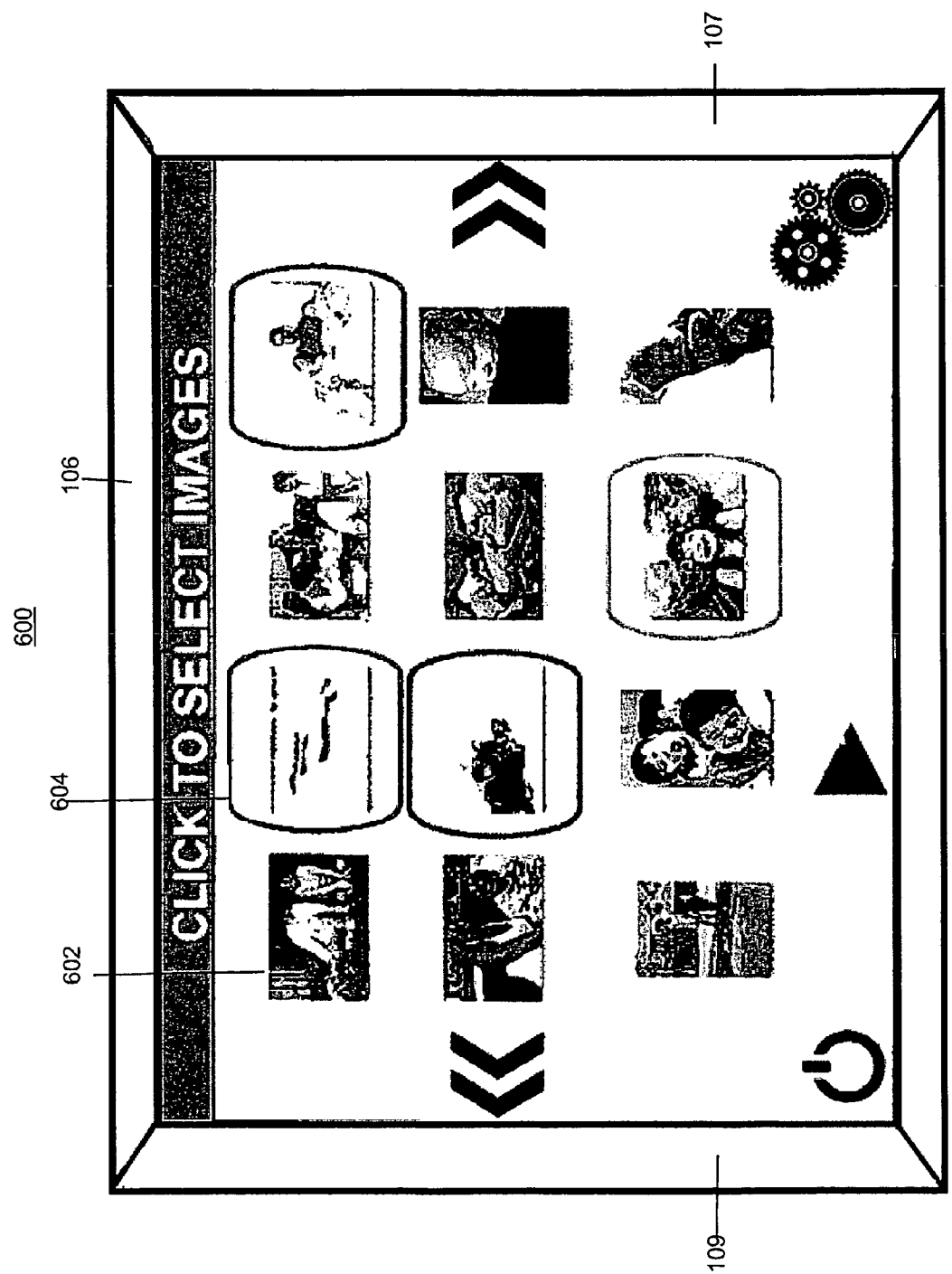
FIG. 6 is an illustration of an example of a thumbnail GUI.

In response to the operator selecting the option 508 to select images by viewing thumbnails, thumbnail GUI 600 is presented to the operator on display 150, as illustrated in FIG. 6. The thumbnail GUI 600 includes thumbnails, such as thumbnail 602, of all or some of the images received by the digital picture frame. The operator can toggle between thumbnails by touching the left region 109 and/or the right region 107. The thumbnail currently being considered by the operator can be visually distinguished from the other thumbnails by, for example, changing the size and/or background color of the thumbnail. By touching the top region 106, the operator can select the thumbnail being considered and, in response, the image corresponding to that thumbnail will be rendered by the display 150 when the display resumes consecutive display of the images. The selected thumbnails, such as thumbnail 604, can be visually distinguished from the unselected thumbnails by, for example, adding a border around the selected thumbnails, and/or changing the size and/or background color of the selected thumbnails.

Figure 7:
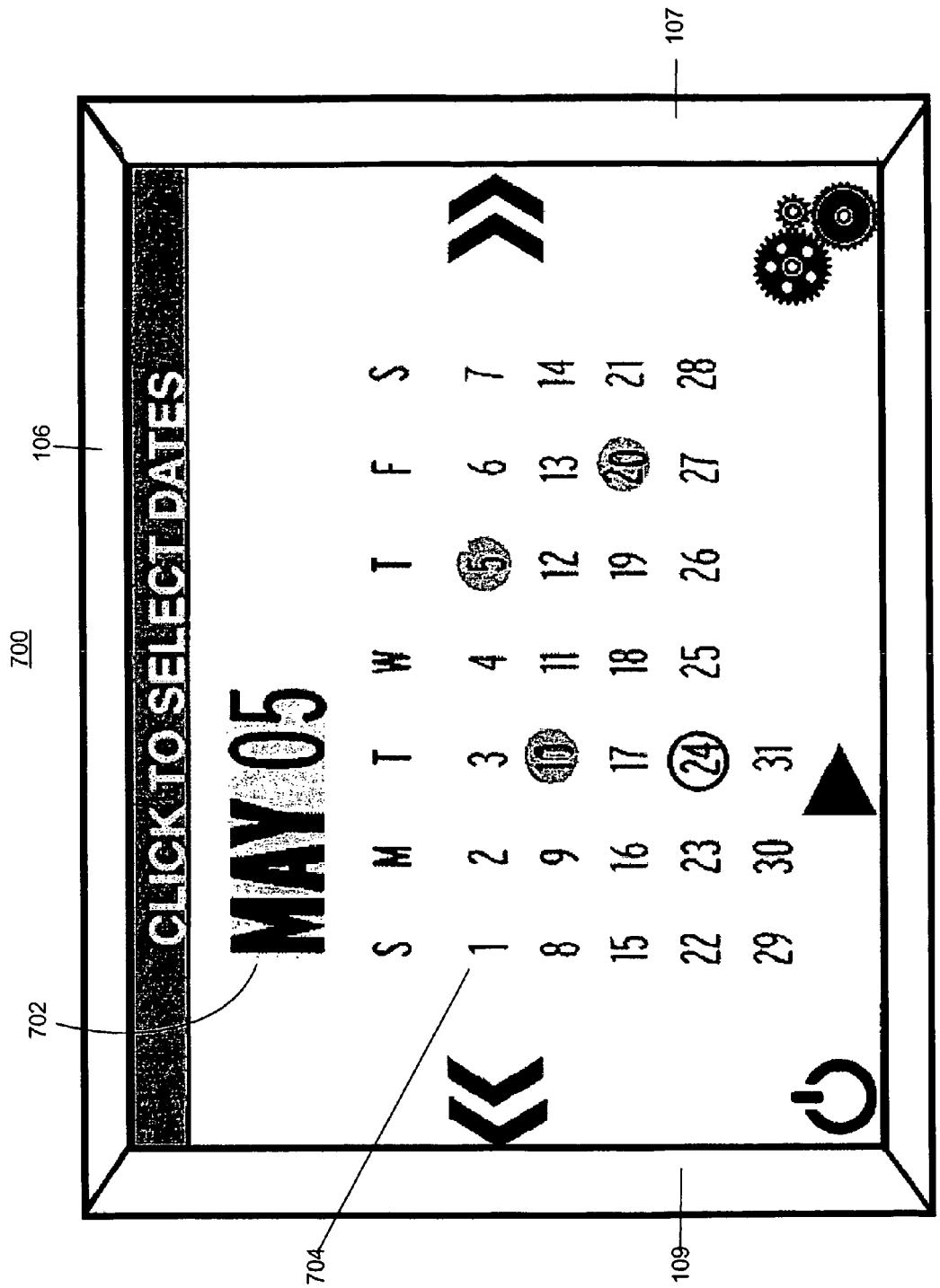
FIG. 7 is an illustration of an example of a date GUI.

In response to the operator selecting the option 510 to select images by date, date GUI 700 is presented to the operator on display 150, as illustrated in FIG. 7. The date GUI 700 includes a calendar of the current month and/or year, or any other month and/or year. The operator can toggle between the month indicator 702 and the day indicators, such as day indicator 704, by touching the left region 109 and/or the right region 107. The month and/or day indicator currently being considered by the operator can be visually distinguished from the other indicators by, for example, changing the size and/or background color of the indicator. By touching the top region 106, the operator can choose that images associated with the selected day, month, and/or year be rendered by the display 150 when the display resumes consecutive display of the images. In some implementations, the date associated with an image may be the date the image was created (e.g., the date a picture was taken), the date the image was received by the digital picture frame, the date of an event depicted by the image, and/or the date the image was last modified.

For example, if the month indicator 702 is selected by the operator, all images that were created in May 2005 can be selected to be rendered by the display 150. In another example, if the day indicator 704 is selected by the operator, all images that were created on May 1, 2005 can be selected to be rendered by the display 150. The selected month and day indicators can be visually distinguished from the other month and/or day indicators by, for example, adding a border around the selected indicators, and/or changing the size and/or background color of the selected indicators.

In some implementations, only dates having associated images are enabled to be considered and, therefore, selected by the operator. For example, at least one image received by the digital picture frame may have been created on May 1, 2005 and, therefore, May 1, 2005 is enabled to be considered by the operator. Enabled month and/or day indicators can be visually distinguished from the other indicators by, for example, changing the size and/or background color of the enabled indicators. In some implementations, when the operator is toggling between the month and/or day indicators, the non-enabled date indicators (i.e., those dates not associated with any received images) are skipped.

Figure 8:
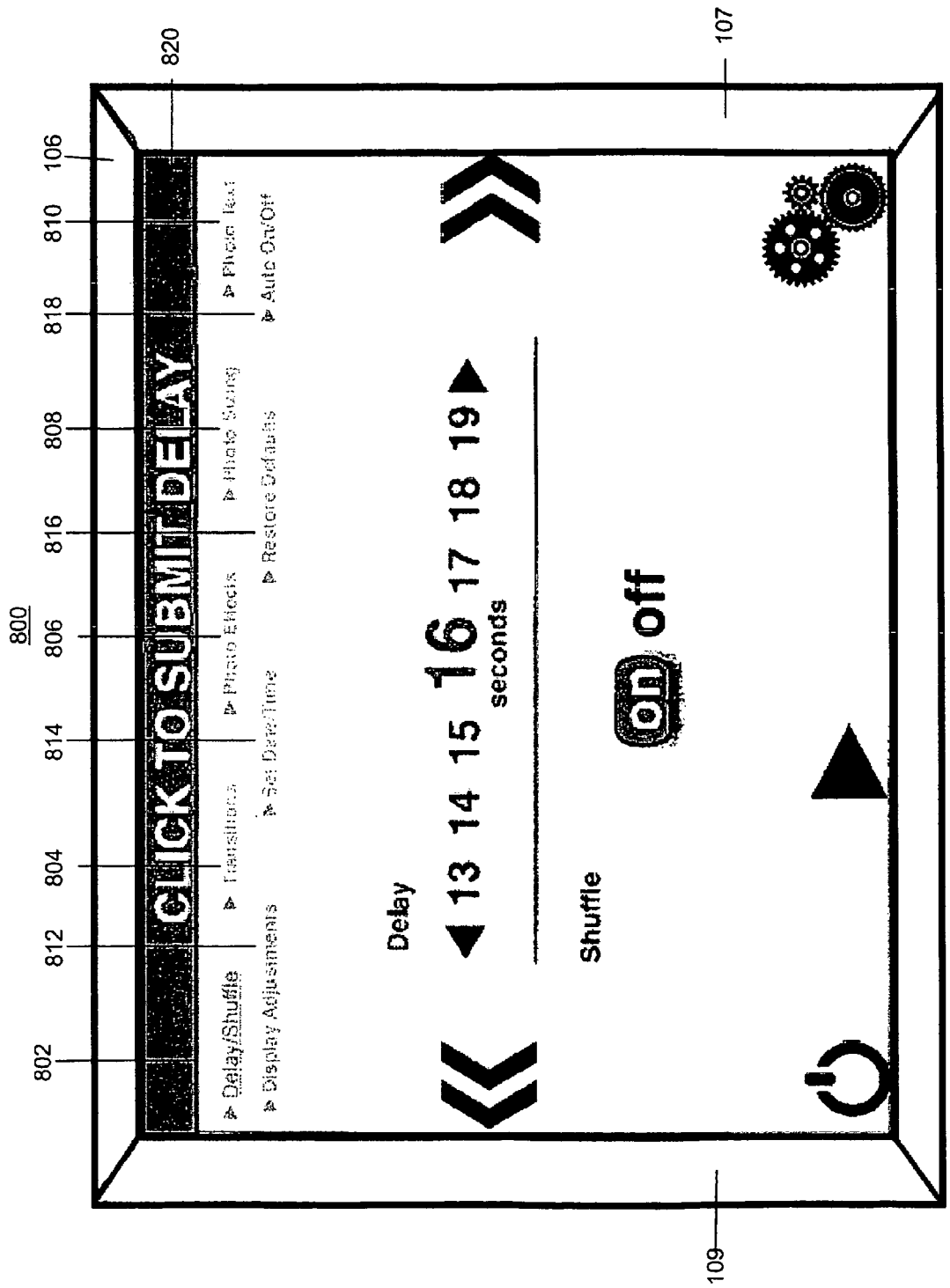
FIG. 8 is an illustration of an example of a frame preference GUI.

In response to the operator selecting the preferences icon 404 of GUI 400, frame preference GUI 800 is presented to the operator on display 150, as illustrated in FIG. 8. The frame preference GUI 800 includes the option 802 for selecting the delay and order of images on the display 150, the option 804 for selecting the transition type between images, the option 806 for selecting display effects of the images, the option 808 for selecting the display image size, the option 810 for selecting the displayed text associated with the images, the option 812 for selecting adjustments to the display 150, the option 814 for setting the current date and time, the option 816 for selecting whether and when the digital picture frame should be automatically turned on and off, and the option 816 for restoring the default preferences of the digital picture frame.

The operator can toggle between options 802-818 by touching the left region 109 and/or the right region 107. The selected option can be visually distinguished from the other options by, for example, changing the font, size, and/or color of the selected option. In addition, a description of the function corresponding to the selected option can be displayed in text area 820. For example, frame preference GUI 800 shows that the operator has selected the option 802 and "CLICK TO SUBMIT DELAY" is shown in the text area 820. By touching the top region 106, the operator can select that the function associated with the selected option be performed.

In response to the operator selecting the option 802, frame preference GUI 800 enables the operator to select the time period between a transition from one image to another on display 150. The operator can also select to randomly display (i.e., shuffle) the images. The operator can toggle between time periods and the option to shuffle by touching the left region 109 and/or the right region 107. The selected time period and shuffle option can be visually distinguished from the others by, for example, changing the font, size, and/or color of the selected time period and shuffle option. By touching the top region 106, the operator can select that the time period and the shuffle option of interest.

Figure 9:
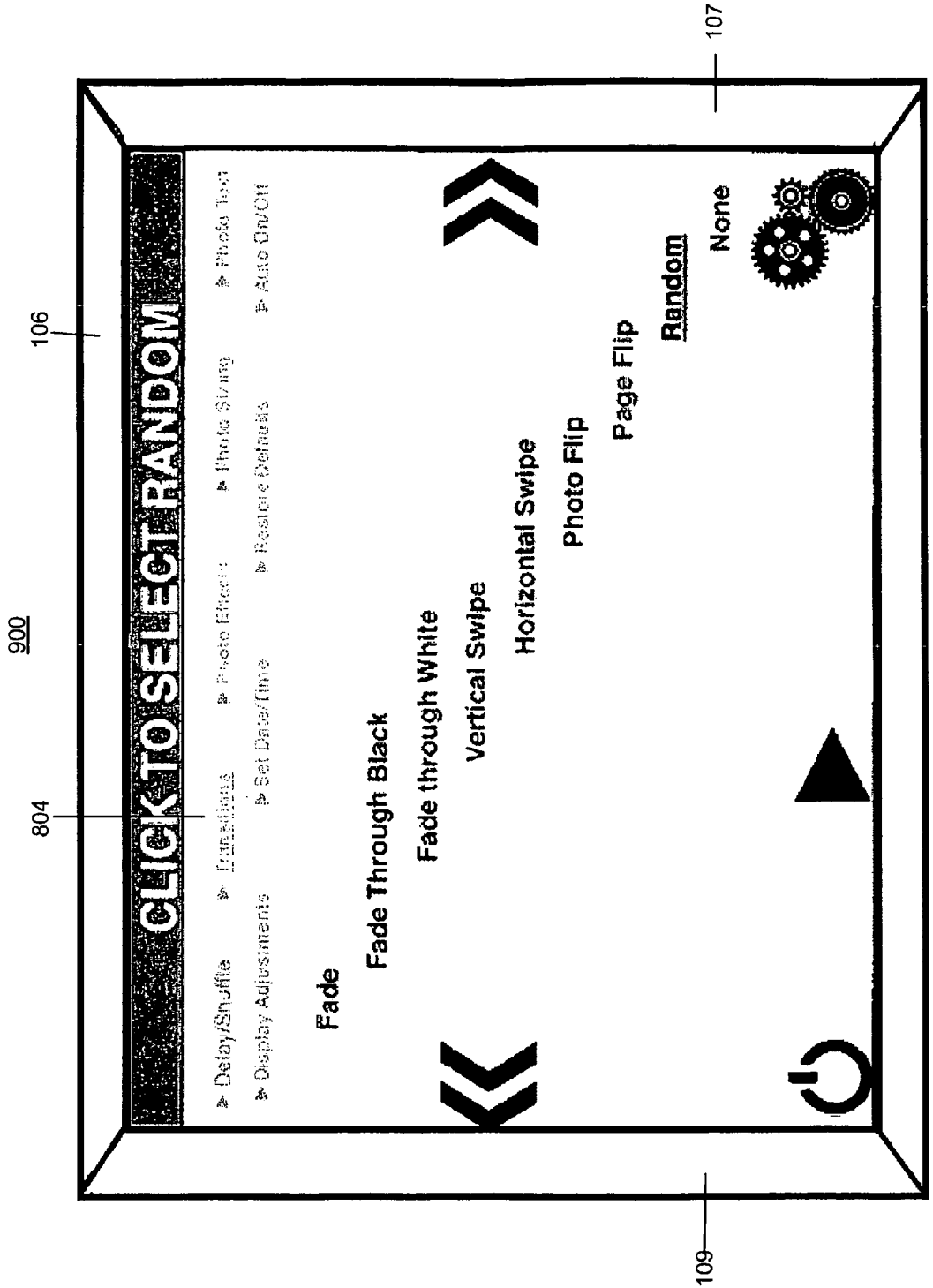
FIG. 9 is an illustration of an example of a transition preference GUI.

In response to the operator selecting the option 804, transition preference GUI 900 enables the operator to select a transition type between one image to another on display 150, as illustrated in FIG. 9. The transition types can include fading, fading through black, fading through white, vertical swiping, horizontal swiping, image flipping, page flipping, a random transition type, or no transition type. The operator can toggle between the transition type options by touching the left region 109 and/or the right region 107. The selected transition type option can be visually distinguished from the other transition type options by, for example, changing the font, size, and/or color of the selected transition type option. By touching the top region 106, the operator can select that the transition type option of interest.

Figure 10:
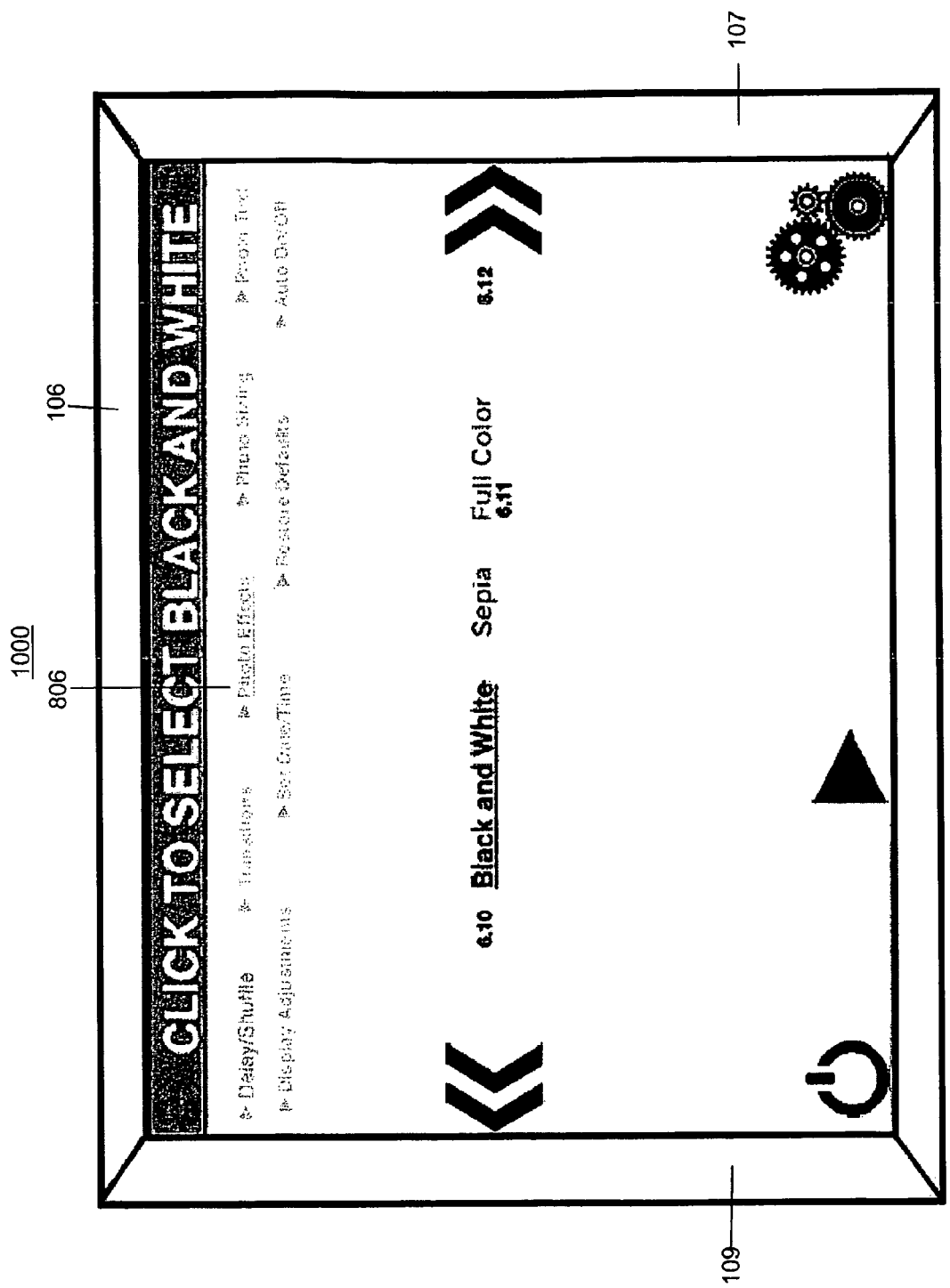
FIG. 10 is an illustration of an example of a display effects GUI.

In response to the operator selecting the option 806, display effects GUI 1000 enables the operator to select a display effect for display of the images, as illustrated in FIG. 10. The display effects can include displaying the images in black and white, in sepia tone, or in color. The operator can toggle between the display effects by touching the left region 109 and/or the right region 107. The selected display effect can be visually distinguished from the other transition types by, for example, changing the font, size, and/or color of the selected display effect. By touching the top region 106, the operator can select that the display effect of interest.

Figure 11:
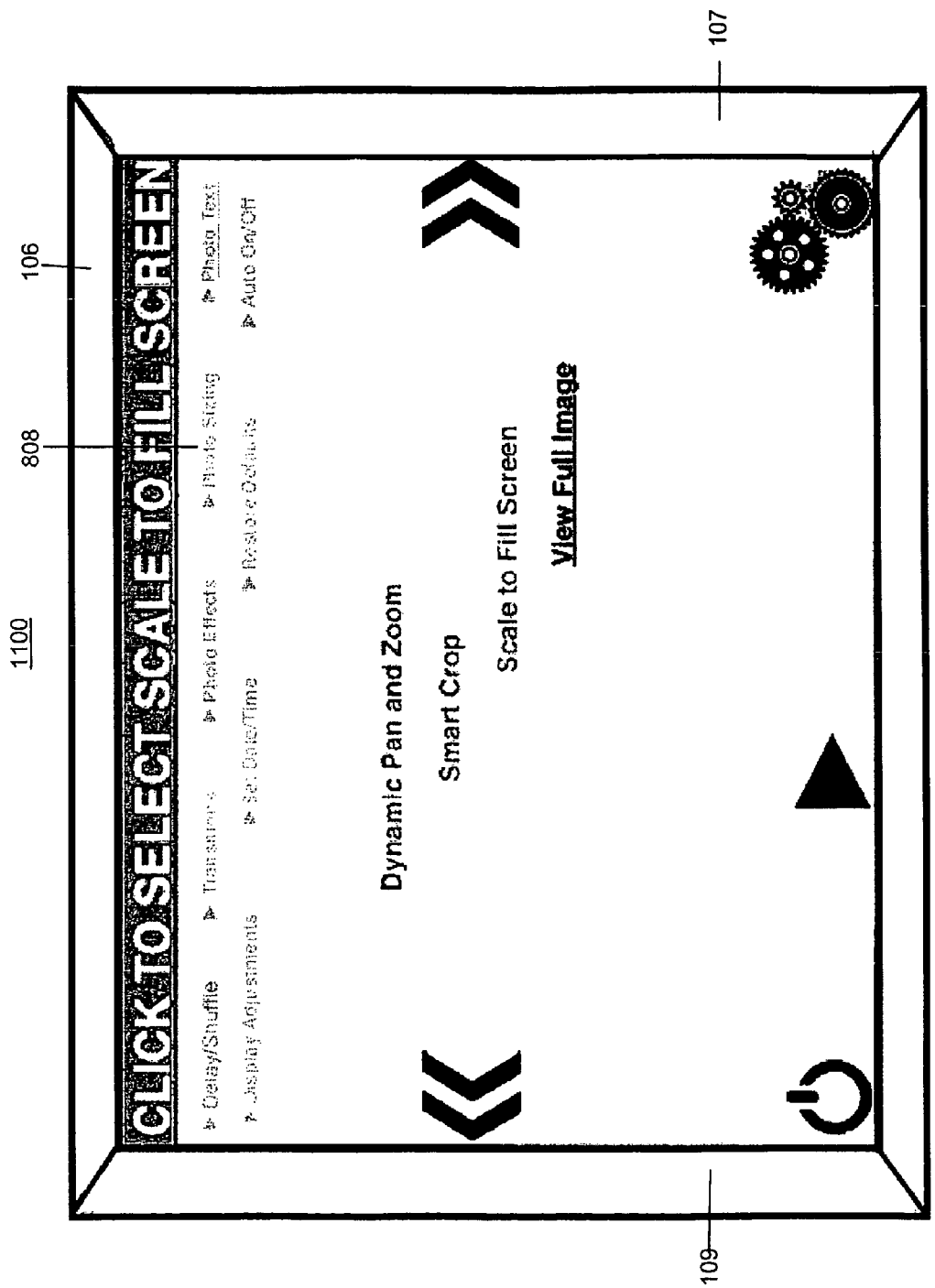
FIG. 11 is an illustration of an example of an image size GUI.

In response to the operator selecting the option 808, image size GUI 1100 enables the operator to select a display size or effect for the display of the images, as illustrated in FIG. 11. The display sizes and effects can include dynamic panning and zooming, smart cropping, scaling to fit the display 150, and displaying the entire image. The operator can toggle between the display image sizes and effects by touching the left region 109 and/or the right region 107. The selected display image size or effect option can be visually distinguished from the other options by, for example, changing the font, size, and/or color of the selected option. By touching the top region 106, the operator can select that the display image size or effect of interest.

The dynamic panning and zooming function can, for example, initially cause display of a particular region and/or object of an image and then pan to the other regions of the image. For example, if an image includes a face, facial recognition software included in the digital picture frame can recognize the region of the image including the face. When the image is displayed using the dynamic panning and zooming function, that region including the face is initially rendered and then other regions of the images are displayed in, for example, a zigzag pattern. In another example, the dynamic panning and zooming can always initially display a predefined region of the image, such as a corner of the image, and pan to other regions of the image in a random and/or predefined pattern.

The smart cropping function can, for example, identify an object of interest included in picture and choose to crop the image so that the object of interest is centered in the displayed image. For example, if an image includes a face, the facial recognition software can identify the face as the object of interest. A predetermined area, based on the size and resolution of the display 150, around the object of interest can be selected and the other portions of the image can be cropped.

The scaling to fit the display function can, for example, use the size of the display 150 and the size of the image to be rendered to determine a scaling factor to be applied to the image so that the entire image is rendered on the display 150. For example, if the display 150 is eight inches by eight inches and the image is twelve inches by twelve inches, the image can be scaled down 25 percent to fit the display 150.

Figure 12:
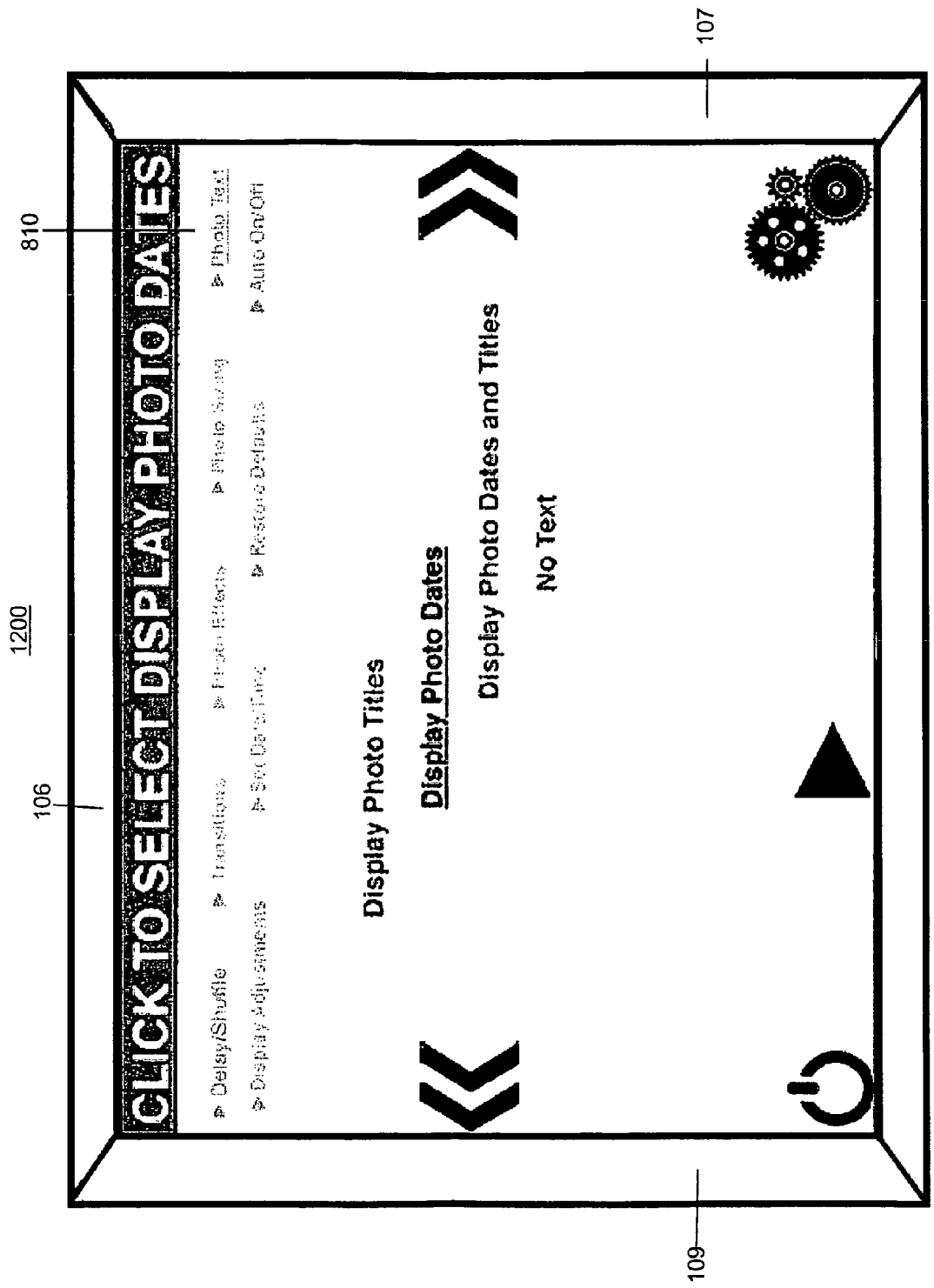
FIG. 12 is an illustration of an example of a text option GUI.

In response to the operator selecting the option 810, text option GUI 1200 enables the operator to select the text to be displayed with the images, as illustrated in FIG. 12. The text can be stored in a header and/or tag of the image, and/or in a text file associated with the image. The text options can include displaying the image titles, one or more dates associated with the images, the titles and one or more dates associated with the images, and no text. The operator can toggle between the text options by touching the left region 109 and/or the right region 107. The selected text option can be visually distinguished from the other text options by, for example, changing the font, size, and/or color of the selected text option. By touching the top region 106, the operator can select that the text option of interest.

Figure 13:
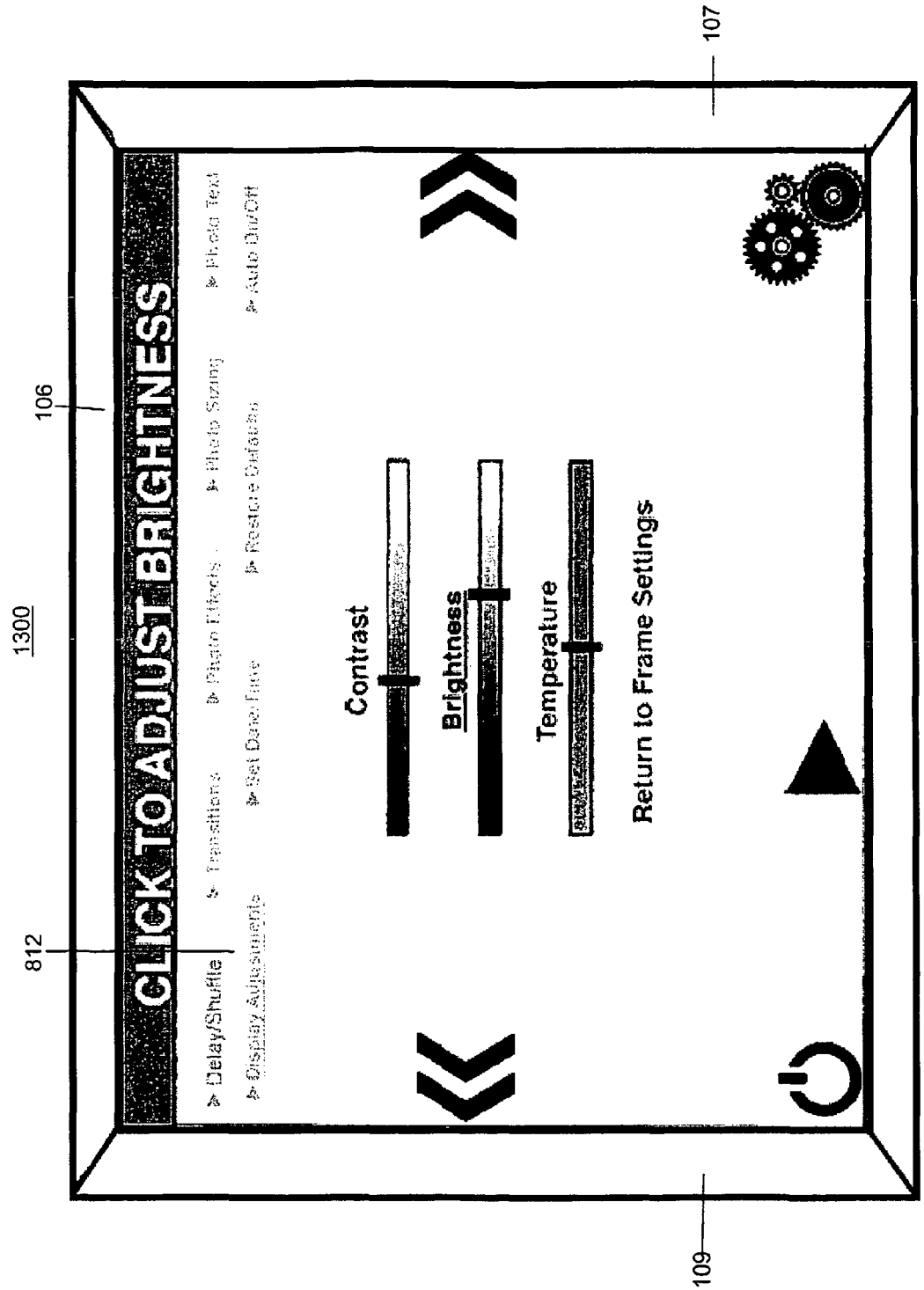
FIG. 13 is an illustration of an example of a display adjustment GUI.

In response to the operator selecting the option 812, display adjustment GUI 1300 enables the operator to set the characteristics of the display 150, as illustrated in FIG. 13. The display characteristics can include contrast, brightness, and temperature of the display 150. The operator can toggle between the display characteristics by touching the left region 109 and/or the right region 107. The selected display characteristic can be visually distinguished from the other display characteristics by, for example, changing the font, size, and/or color of the selected display characteristic. The value of the selected display characteristic can be adjusted by touching the left region 109 and/or the right region 107. By touching the top region 106, the operator can select that the value of the selected display characteristic.

Figure 14:
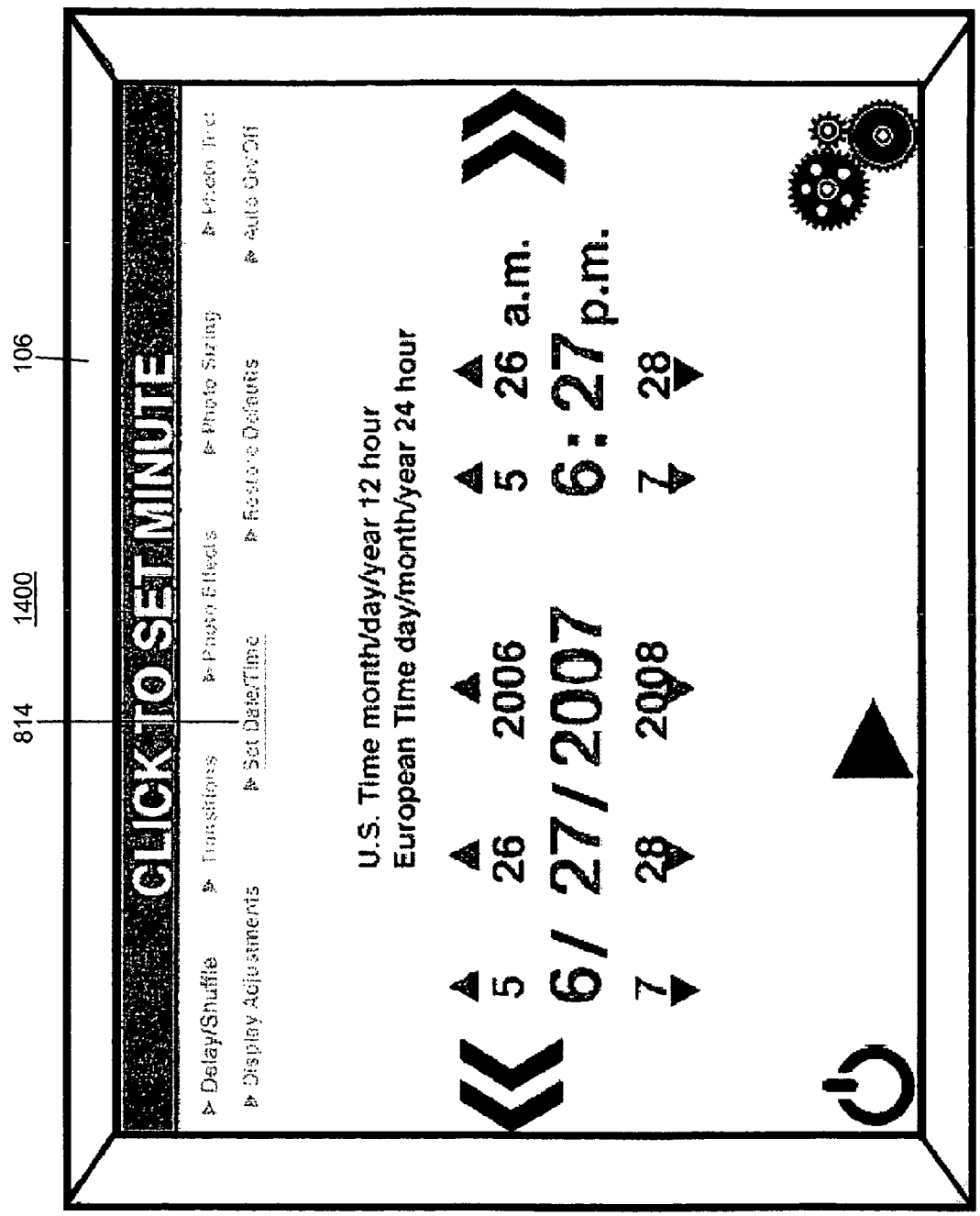
FIG. 14 is an illustration of an example of a date and time setting GUI.
Figure 15:
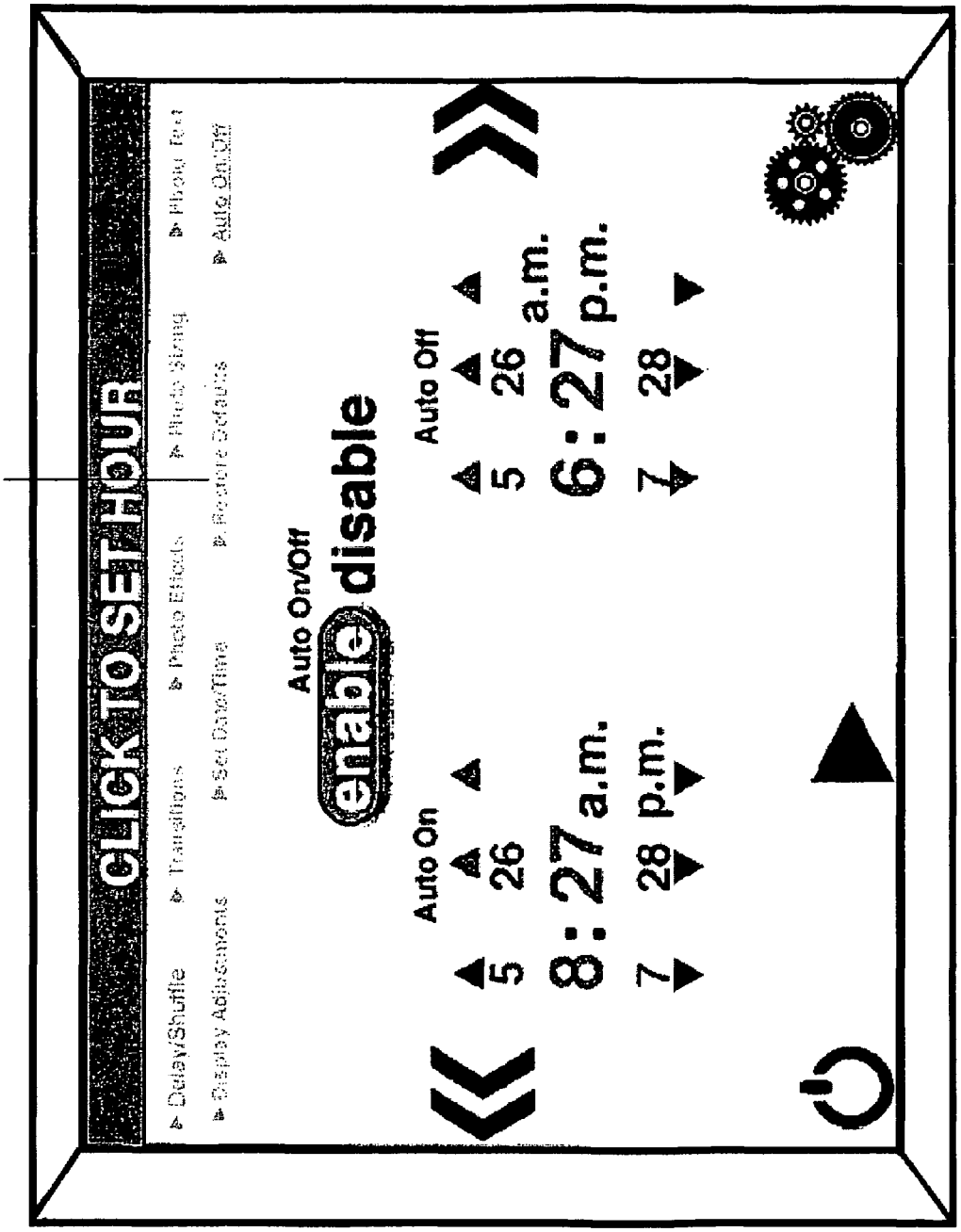
FIG. 15 is an illustration of an example of an auto setting GUI.
Figure 16:
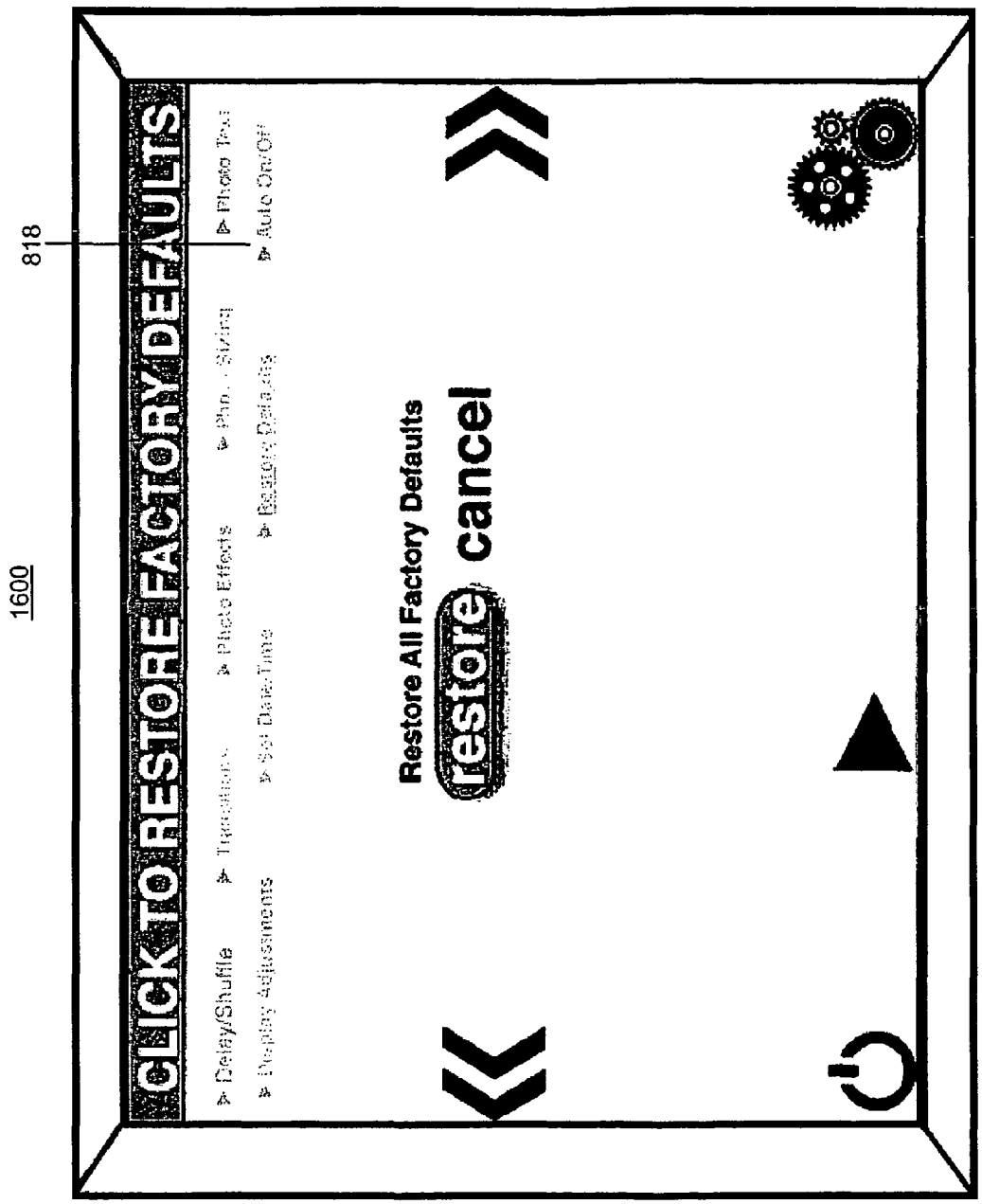
FIG. 16 is an illustration of an example of a default setting confirmation GUI.

In response to the operator selecting the option 814, date and time setting GUI 1400 enables the operator to set the current date and time, as illustrated in FIG. 14. The date and time display format, the month, the day, the year, the hour, and the minutes can be set by the operator. In response to the operator selecting the option 816, auto setting GUI 1500 enables the operator to enable or disable the automatic turning on and off of the digital picture frame, as illustrated in FIG. 15. The time that the frame is to be turned on and the time that the frame is to be turned off can be specified by the operator. In response to the operator selecting the option 818, default setting confirmation GUI 1600 enables the operator to confirm that the default settings of the digital picture frame should be restored, as illustrated in FIG. 16.

In some implementations, as described above, once the operator places a memory card in the memory card reader of the digital picture frame, the digital picture frame will automatically (i.e., without human interaction) start to consecutively render the images stored on the memory card on the display 150. In other implementations, once the operator places a memory card in the memory card reader of the digital picture frame, the transfer GUI 1700 illustrated in FIG. 17 enables the operator to select that the images be rendered directly from the memory card or select that the images stored on the memory card be transferred to an internal memory of the digital picture frame.

In one example, if the internal memory of the digital picture frame does not have enough storage capacity to store all of the images on the memory card, the operator can select the specific images to be transferred and/or the images matching a particular criteria, such as being associated with a particular date range, can be transferred. The unlocked images stored in the internal memory of the digital picture frame can be deleted to create additional space for the images to be transferred from the memory card. For example, the operator can specify that particular unlocked images to be deleted. In another example, the digital picture frame can delete unlocked images based on the date that the images were stored on the internal memory, such that older images are deleted before newer images, or vice-versa. In yet another example, the digital picture frame can delete unlocked images based on the frequency with which the images were rendered, such that the images rendered a higher number of times are deleted before images rendered a lower number of times, or vice-versa. In still another example, the operator can select to delete unlocked images being associated with a particular folder, date, and/or date range.

In some implementations, rather than the images being transferred from a memory card to the internal memory of the digital picture frame, the images to be transferred can be received from, for example, a network, a web service, an image capturing device, and/or a computer. In addition, rather than the images from the memory card being transferred to the internal memory of the digital picture frame, the images can be transferred to a network storage device, a web service, an image capturing device, and/or a computer.

Figure 18:
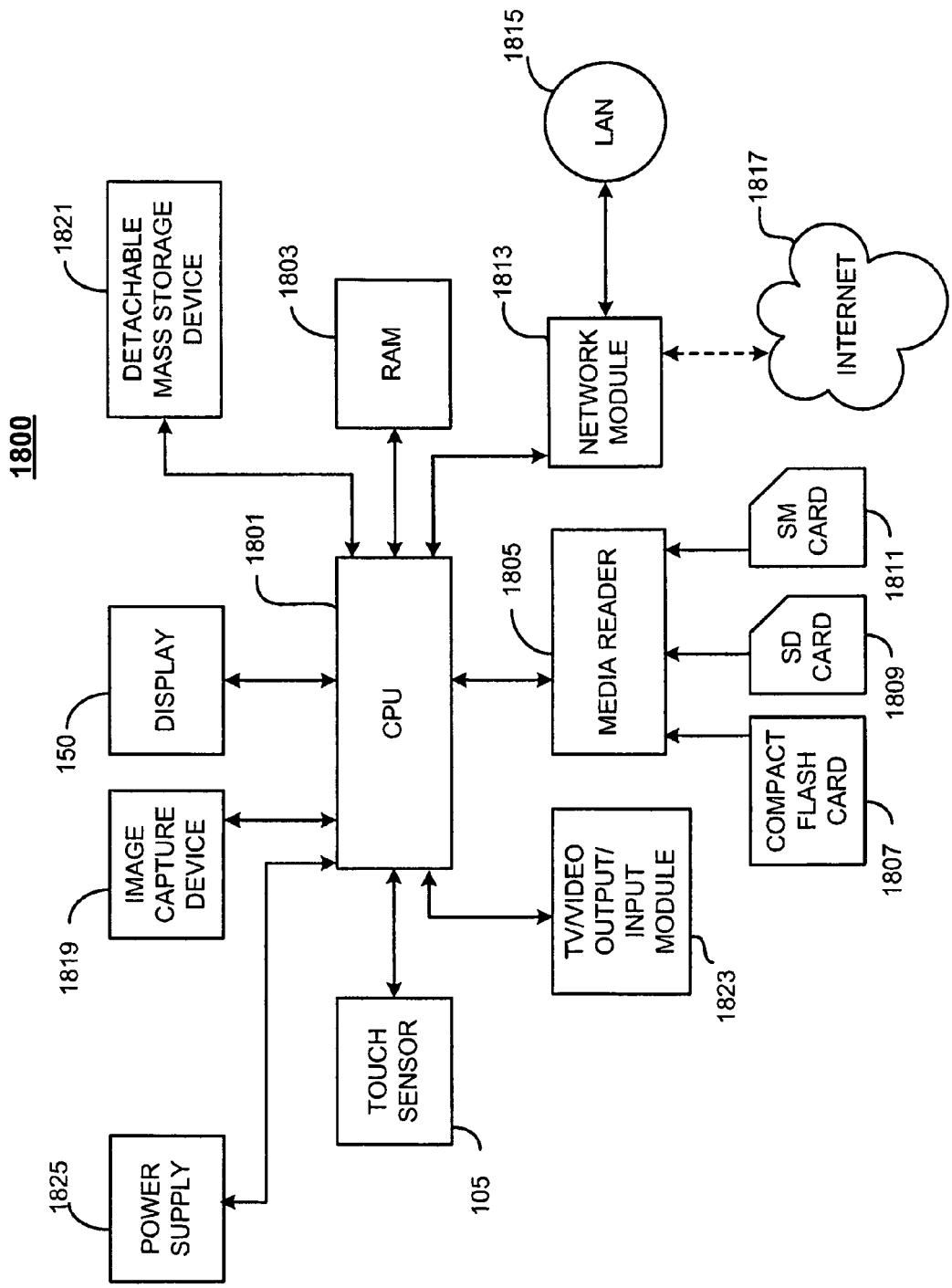
FIG. 18 is a block diagram of an example image display device.

FIG. 18 shows a schematic diagram of an example image display device 1800, such as a digital picture frame, that can be used to render images. The device 1800 includes a touch sensor 105, a display 150, a processor 1801, an internal memory (e.g., random access memory) 1803, a media reader 1805, a network module 1813, an image capture device 1819, a detachable mass storage device 1821, a TV/Video output/input module 1823, and a power supply 1825. Each of the components can, for example, be interconnected using a device bus.

The touch sensor 105 can be an type of touch sensor, such as, for example, an electrostatic sensor. In some implementations, the touch sensor 105 can include one or more buttons that can detect when the operator presses down on the matte.

The processor 1801 is capable of processing instructions for execution within the device 1800. For example, the processor can receive images from the internal memory 1803, media reader 1805, network module 1813, image capture device 1819, detachable mass storage device 1821, and/or TV/video out/input module 1823 for display on the display 150. The processor can also receive indications that a particular region or location of the touch sensor 105 has been touched from the touch sensor 105. In one implementation, the processor 1801 is a single-threaded processor. In another implementation, the processor 1801 is a multi-threaded processor. The processor 710 is capable of processing instructions stored in, for example, the internal memory 1803 to display images and graphical information for a GUI on the display 150.

The display 150 is configured to render an image. In various different implementations, for example, display 150 can include a liquid crystal display (LCD), a plasma display, a digital light processing (DLP) display, an organic light-emitting diode (OLED) display, or any other type of display device configured to render an image. In some implementations, some or all of the display 150 can be touch sensitive. For example, a region along the perimeter of the display 150 may be touch sensitive.

The internal memory 1803 stores information, such as images, computer instruction, and/or device settings, within the device 1800. In one implementation, the internal memory 1803 is a random access memory. In one implementation, the internal memory 1803 is a volatile memory unit. In another implementation, the internal memory 1803 is a non-volatile memory unit.

The media reader 1805 receives various media, such as compact flash cards 1807, secure digital cards 1809, and smart media cards 1811. The media reader 1805 reads data, such as images, from the various media and can provide that data to the processor 1801.

The network module 1813 is a communication device configured to exchange communications with a local area network 1815 and/or the Internet 1818. The network module 1813 may be a wireless communication module configured to exchange wireless communications. For example, the network module 1813 may be a wireless communication device configured to exchange communications over a wireless data channel and a wireless voice channel. The wireless communication device may include one or more of a Bluetooth module, a GSM module, a radio modem, cellular transmission module, or any type of module configured to exchange communications in one of the following formats: GSM or GPRS, CDMA, EDGE or EGPRS, EV-DO or EVDO, UMTS, or IP.

In some implementations, the network module 1813 can communicate with a web service, such as, for example, a photo-storing, photo-sharing service, and/or social networking service, over the Internet 1818 to receive images to be displayed on the device 1800. The network module 1813 can communicate with another device, such as, for example, a personal computer and/or media center, over the local area network 1815 to receive images to be displayed on the device 1800.

In some implementations, the image capture device 1819 can be an image capture device that is integral to the image display device 1800, such as a digital camera that is incorporated in the image display device 1800. In other implementations, the image capture device 1819 can be detachably connected to the image display device 1800 though a connection module, such as a Universal Serial Bus (USB) and/or IEEE 1394 interface module. In various different implementations, the image capture device 1819 can, for example, include a digital camera, a scanner, and a digital camcorder. The image capture device 1819 can forward images to the internal memory 1803, detachable mass storage device 1821, memory cards 1807, 1809, and 1811, and/or network module 1813.

The detachable mass storage device 1821 is capable of providing mass storage for the device 1800. In one implementation, the detachable mass storage device 1821 is a computer-readable medium. In various different implementations, the detachable mass storage device 1821 can, for example, include a hard disk device, an optical disk device, or some other large capacity storage device.

The TV/video output/input module 1823 provides input/output operations for the device 1800. In one implementation, the TV/video output/input module 1823 includes a module, such as, for example, a digital video connector, configured to output or input image and video information.

The power supply 1825 can be, for example, a plug that connects to an AC power supply that connects to a standard wall power outlet. In other examples, power supply 1825 can receive power through a USB cable that is connected to the device 1800. In other implementations, the power supply 1825 may be local to the device 1800, such as a battery. In yet other examples, the power supply 1825 can be a module configured to receive wireless power signals to power the device 1800.

A module can be a piece of hardware that encapsulates a function. A module can perform one or more functions, and one piece of hardware can perform the functions of more than one of the modules described herein. Similarly, more than one piece of hardware can be used to perform the function of a single module described herein.

Figure 19:
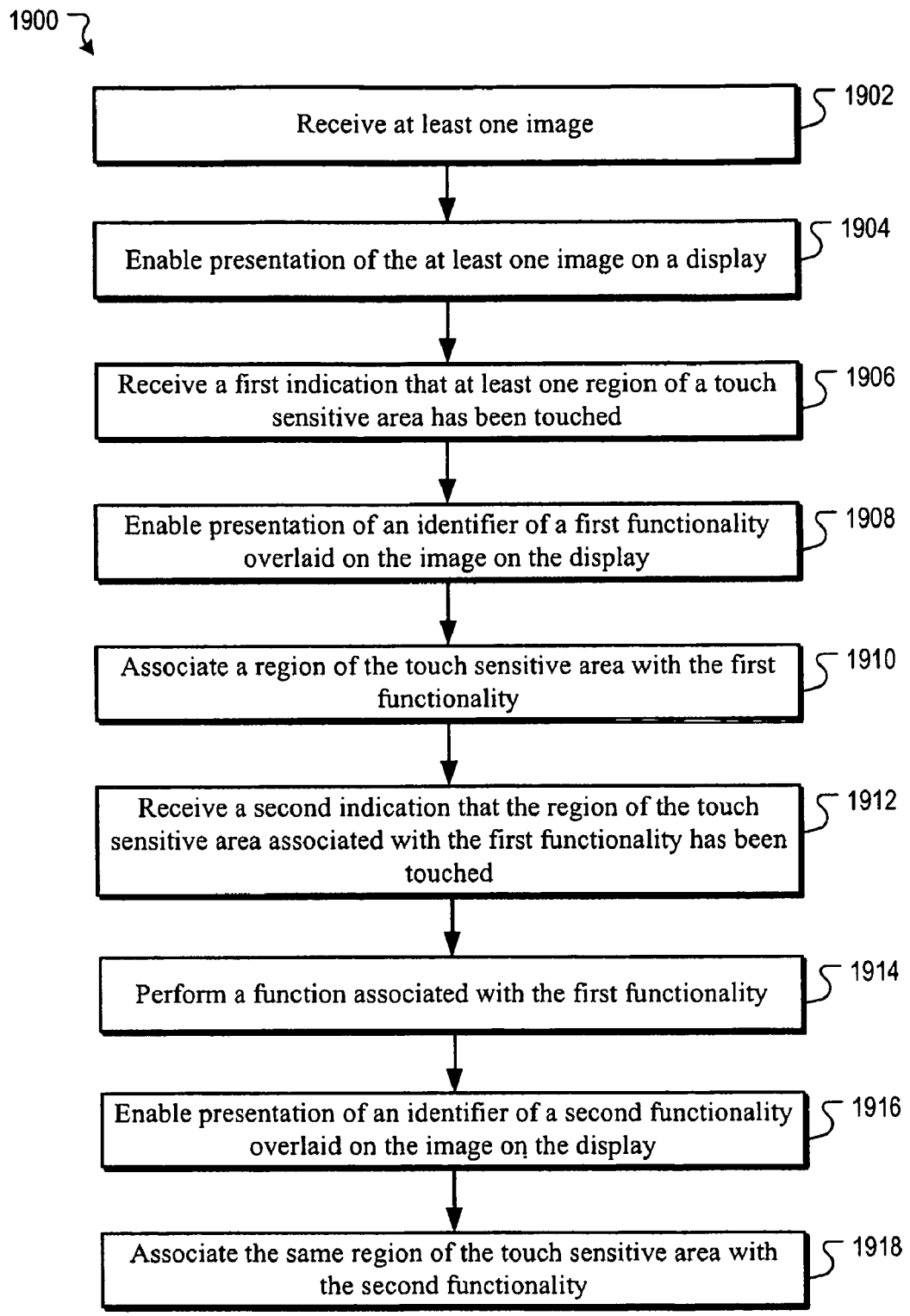
FIG. 19 is a flowchart showing an example process for touch controlling an image display device.

FIG. 19 is a flowchart showing an example process 1900 for touch controlling an image display device, such as the image display device 1800. One or more steps in the process 1900 can be carried out by, for example, the processor 1801.

Initially, at least one image is received (step 1902). The at least one image can be received by the processor 1801 from the internal memory 1803, media reader 1805, network module 1813, image capture device 1819, detachable mass storage device 1821, and/or TV/video output/input module 1823. After the at least one image is received, it is processed by the processor 1801 for presentation on the display (step 1904). For example, if the at least one images is stored in a compressed file format, such as the JPG format, the processor can uncompress the image before the image is rendered. In another example, if the operator of the device 1800 has selected a display characteristic, such as displaying images in black and white, as described above in connection with FIG. 10, the processor can process the at least one image according to the selected characteristic.

Next, the processor 1801 receives a first indication that at least one region of the touch sensitive area 105 has been touched (step 1906). In some implementations, the first indication can identify the region of the touch sensitive area 105 that has been touched. If more than one region of the touch sensitive area 105 has been touched, the indication can identify both regions to indicate, for example, that a corner has been touched. In other implementations, the indication can identify the coordinates of the region where the touch sensitive area 105 has been touched. The processor 1801 can distinguish between brief touches and touches that are greater than a predetermined time period.

In response to receiving the first indication, the processor 1801 enables presentation of an identifier of a first functionality overlaid on the image being rendered by the display (step 1908). For example, if the display 150 is consecutively rendering images when the first indication is received, the initial functionality GUI 100, including icons 112, 114, 116, 119, 120, 122, 124, 126, and 128, can be presented on the display 150. The first functionality can be any one of the functionalities described above, such as, for example, the pausing functionality associated with icon 120.

Then, the processor associates a region of the touch sensitive area 105 with the first functionality (step 1910). For example, if the first functionality is the pausing functionality associated with icon 120, the bottom region 108 is associated with the pausing functionality, as described above in connection with FIG. 1. In some implementations, only those regions associated with one or more functionalities are enabled and those regions not associated with any functionality are disabled.

Next, the processor 1801 receives a second indication that the region of the touch sensitive area 105 associated with the first functionality has been touched (step 1912). By selecting the region of the touch sensitive area 105 associated with the first functionality, the operator requests that the device 1800 perform the function associated with the first functionality. For example, as described above in connection with FIG. 1, the operator touches the bottom region 108 associated with the pausing functionality to effect pausing of the consecutive display of images.

In response to receiving the second indication, the processor 1801 performs the function associated with the first functionality (step 1914). For example, continuing the example above, in response to receiving a second indication that the operator has touched the bottom region 108 associated with the pausing functionality, the processor 1801 will pause the consecutive display of images.

The processor 1801 will then enable presentation of an identifier of a second functionality overlaid on the image being rendered by the display 105 (step 1916). In some implementations, the second functionality can be different from the first functionality. For example, after the consecutive display of images has been paused, the play icon 122 can be presented instead of the pause icon 120 to resume the consecutive display of images on the display 150. The resuming functionality will be associated with the bottom region 108 of the touch sensitive area 105 (step 1918).

Figure 20:
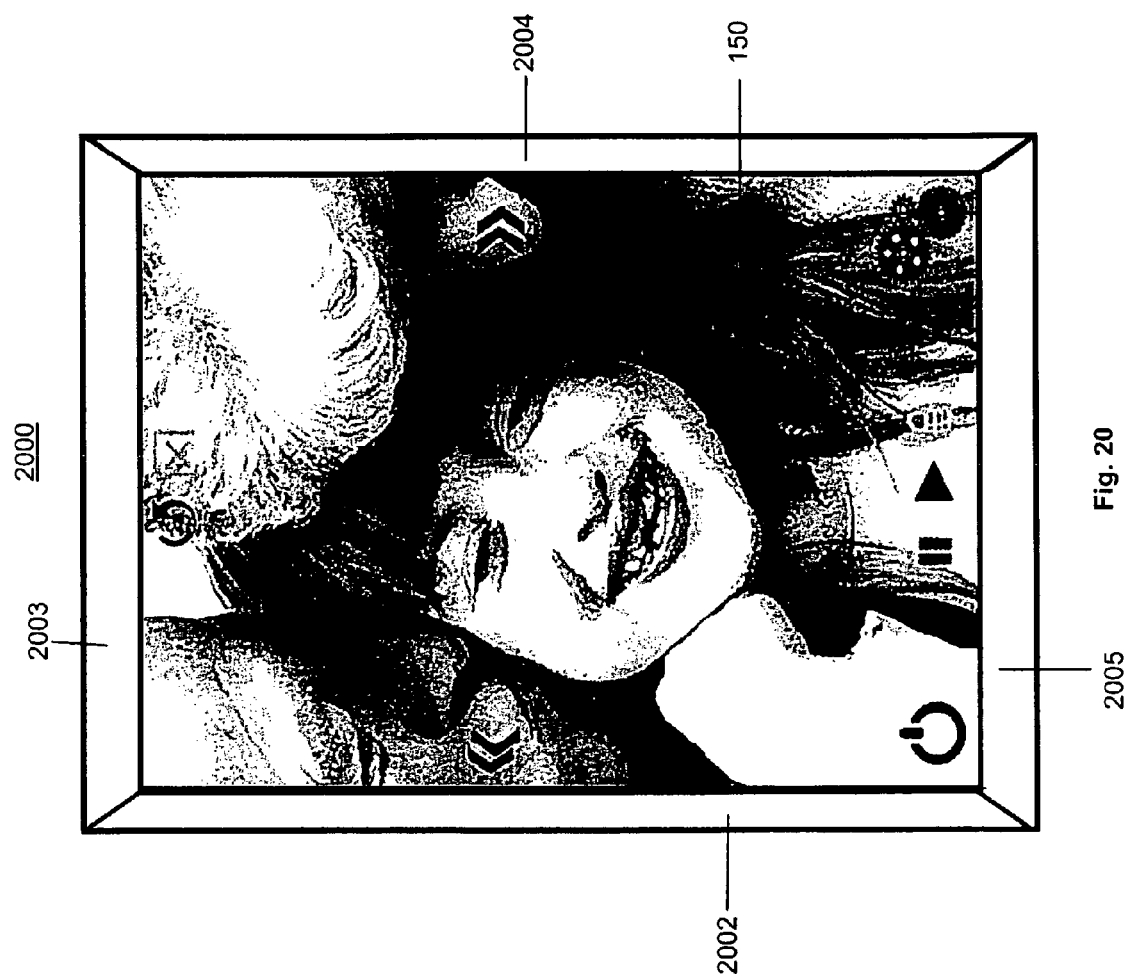
FIG. 20 is an illustration of an example of another rotation GUI.

A number of implementations have been described. Nevertheless, it will be understood that various modifications may be made without departing from the spirit and scope of the claims. For example, if the image display device 1700 is rotated 90 degrees, the image being displayed by the display 150 can automatically (i.e., without human interaction) be rotated 90 degrees, as illustrated by rotation GUI 2000 in FIG. 20. In addition, the previous the top region 106 becomes the left region 2002, the previous the right region 107 becomes the top region 2003, the previous the bottom region 108 becomes the right region 2004, and the previous the left region 109 becomes the bottom region 2005.

At least some of the display 150 can be touch sensitive, replacing the touch sensor 105 of the image display device 1700. For example, a region extending a predetermined distance (e.g., outer periphery) from the perimeter of the display 150 can be touch sensitive. The top portion of the outer periphery can correspond to the top region 106, the right portion of the outer periphery can correspond to the right region 107, the bottom portion of the outer periphery can correspond to the bottom region 108, and the left portion of the outer periphery can correspond to the left region 109.

The touch sensitive area 105 can determine the coordinate being touched by the operator. The processor 1701 can associate predefined coordinates with various functions. For example, the coordinates of the top region 106 of the touch sensitive area 105 can be associated with the rotating and deleting functions. If multiple regions are defined on each side of the display, the coordinates of the subregions can each be associated with a different function. For example, a top quarter of the right side of the touch sensitive area 105 can be associated with a first functionality and a second quarter of the right side of the touch sensitive area 105 can be associated with a second functionality.

Visual indicators of the regions can be displayed on the display 150. For example, a bar can be displayed along the periphery of the display 150 corresponding to length of each region. When the four regions 106-109 are associated with functionalities, bars can extend along the entire periphery of the display 150 to indicate to the operator that the four regions are selectable. When only a single region, such as top region 106, is selectable, a bar can extend only along the top side of the display 150. In some implementations, the visual indicators can be displayed during the entire period the region is selectable. In other implementations, the visual indicators can be displayed during a predetermined time period, such as, for example, three seconds, after the region is activated.

The identifiers of the functions, options, and applications of the image display device 1700 will cease to be rendered over the image if operator does not again touch the touch sensitive area 105 within a predetermined period of time, such as, for example, five seconds, after previously the touching the touch sensitive area 105. For example, if GUI 100 is displayed on the display 150 in response to receiving the first indication that the operator has touched the touch sensitive area 105, icons 112, 114, 116, 119, 120, 122, 124, 126, and 128, will cease to be presented on the display 150 if the operator does not touch the touch sensitive area 105 again within five seconds.

In some implementations, to power on the image display device 1700, the operator can touch any region or a particular region of the touch sensitive area 105. In other implementations, the image display device 1700 can include a power on switch or button.

The processor 1701 can be configured to play videos, and the image display device 1700 can include one or more speakers to play sound, such as a sound associated with an image and/or with a video.

Multiple image display devices can be interconnected to share images. In some implementations, the multiple image display devices can be synchronized to have the same preferences and display the same images simultaneously.

Portions of the display 150 that are not used to display an image can be filled in with a particular color, such as black.

The images can be associated with geographic locations, such as, for example, the geographic location that the image was created (e.g., the geographic location that a picture was taken). For example, the operator can choose to select images being associated with one or more particular geographic regions to be rendered on the display 150. In another example, the operator can choose to display text of the geographic location associated with the image. In yet another example, the operator can choose to delete or lock images in the internal memory 1703 being associated with one or more particular geographic regions.

The processor instructions for touch controlling the image display device can be packaged as an operating system that can be ported to various image display devices. The operating system can include an application programming interface (API) to support the building of applications for the operating system. The applications can control new GUIs for setting image display preferences, and include additional indicators of functions associated with the image display device. In addition, the applications can specify the regions of the touch sensitive area to be associated with the various functions. Developers can write applications that can be transferred to the image display device via, for example, the media reader 1805, network module 1813, and/or detachable mass storage device 1821.

It is to be understood the implementations are not limited to particular devices or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise.

Accordingly, other implementations are within the scope of this application.

What is claimed is:

1. An image display device, comprising:
   a display configured to render an image and an identifier of a functionality;
   a matte surrounding the display, the matte having two or more regions that are touch sensitive; and
   a processor configured to:
   enable presentation of the image on the display,
   receive a first indication that at least one of the two or more regions of the matte have been touched,
   in response to reception of the first indication that the at least one of the two or more regions of the matte have been touched:
   associate one of the two or more regions of the matte with a first functionality associated with subsequent interaction with the matte, and
   enable presentation of an identifier of the first functionality associated with subsequent interaction with the matte overlaid on the image on the display,
   receive a second indication that the one region of the matte associated with the first functionality has been touched, and
   in response to reception of the second indication that the one region of the matte associated with the first functionality has been touched:
   perform a function associated with the first functionality,
   associate the one region of the matte with a second functionality associated with subsequent interaction with the matte, the second functionality being different from the first functionality, and
   enable presentation of an identifier of the second functionality associated with subsequent interaction with the matte overlaid on the image on the display.

2. An image display device, comprising:
   a display configured to render an image and an identifier of a functionality;
   a matte surrounding the display, the matte having two or more regions that are touch sensitive; and
   a processor configured to:
   enable presentation of the image on the display,
   receive an indication that at least one of the two or more regions of the matte have been touched, and
   enable presentation, in response to reception of the indication that the at least one of the two or more regions of the matte have been touched, of an identifier of a functionality associated with subsequent interaction with the matte overlaid on the image on the display.

3. The image display device of claim 2, wherein the processor is further configured to:
   receive another indication that at least one of the two or more regions of the matte have been touched; and
   perform, in response to reception of the other indication that the at least one of the two or more regions of the matte have been touched, a function associated with the functionality.

4. The image display device of claim 3, wherein the processor is further configured to:
   enable presentation, in response to reception of the other indication that the at least one of the two or more regions of the matte have been touched, of an identifier of another functionality associated with subsequent interaction with the matte, the other functionality being different from the functionality.

5. The image display device of claim 3, wherein the processor is further configured to:
   clear presentation, in response to reception of the other indication that the at least one of the two or more regions of the matte have been touched, of the identifier of the functionality overlaid on the image on the display.

6. The image display device of claim 2, wherein the processor is configured to:
   receive the indication that the at least one of the two or more regions of the matte have been touched by receiving an indication that two of the two or more regions of the matte have been touched; and
   enable presentation of the identifier of the functionality associated with subsequent interaction with the matte overlaid on the image on the display by enabling presentation, in response to reception of the indication that both of the two or more regions of the matte have been touched, of the identifier of the functionality associated with subsequent interaction with the matte overlaid on the image on the display.

7. The image display device of claim 2, wherein the processor is configured to enable presentation of the identifier of the functionality associated with subsequent interaction with the matte overlaid on the image on the display by enabling presentation of an identifier of image rotation functionality overlaid on the image on the display.

8. The image display device of claim 7, wherein the processor is further configured to:
   receive another indication that at least one of the two or more regions of the matte have been touched; and
   perform, in response to reception of the other indication that the at least one of the two or more regions of the matte have been touched, rotation of the image on the display.

9. The image display device of claim 2, wherein the processor is configured to enable presentation of the identifier of the functionality associated with subsequent interaction with the matte overlaid on the image on the display by enabling presentation of an identifier of image deletion functionality overlaid on the image on the display.

10. The image display device of claim 9, wherein the processor is further configured to:
    receive another indication that at least one of the two or more regions of the matte have been touched;
    perform, in response to reception of the other indication that the at least one of the two or more regions of the matte have been touched, deletion of the image; and
    enable presentation of another image on the display.

11. The image display device of claim 2, wherein the processor is configured to enable presentation of the identifier of the functionality associated with subsequent interaction with the matte overlaid on the image on the display by enabling presentation of an identifier of image selection functionality overlaid on the image on the display.

12. The image display device of claim 11, wherein the processor is further configured to:
receive another indication that at least one of the two or more regions of the matte have been touched; and
enable presentation, in response to reception of the other indication that the at least one of the two or more regions of the matte have been touched, of another image on the display.

13. The image display device of claim 2, wherein the processor is further configured to enable presentation, in response to reception of the indication that the at least one of the two or more regions of the matte have been touched, of an identifier of an application overlaid on the image on the display.

14. The image display device of claim 13, wherein the processor is further configured to:
receive another indication that at least one of the two or more regions of the matte have been touched; and
in response to reception of the other indication that the at least one of the two or more regions of the matte have been touched:
clear presentation of the image on the display, and
enable presentation of an interface of the application on the display.

15. The image display device of claim 14, wherein the processor is configured to enable presentation of the interface of the application on the display by enabling presentation of a list of customizable digital image frame settings on the display.

16. The image display device of claim 2, wherein the matte has four regions.

17. A method for controlling an image display device, the method comprising:
enabling presentation of an image on a display;
receiving, at a first time, a first indication that an operator has touched at least one of two or more regions of a touch sensitive area surrounding the display;
enabling presentation, in response to reception of the first indication that the at least one of the two or more regions of the touch sensitive area have been touched, of an identifier of a first functionality overlaid on the image on the display;
receiving, at a second time that is after the first time, a second indication that the operator has touched at least one of the two or more regions of the touch sensitive area; and
enabling presentation, in response to reception of the second indication that the at least one of the two or more regions of the touch sensitive area have been touched, of an identifier of a second functionality overlaid on the image on the display, the second functionality being different than the first functionality.

18. The method of claim 17, further comprising:
performing, in response to reception of the second indication that the at least one of the two or more regions of the touch sensitive area have been touched, a first function associated with the first functionality.

19. The method of claim 17, further comprising:
enabling presentation, in response to reception of the first indication that the at least one of the two or more regions of the touch sensitive area have been touched, of an identifier of an application overlaid on the image on the display.

20. The method of claim 17, further comprising:
associating one of the two or more regions of the touch sensitive area with the first functionality, wherein receiving, at the second time that is after the first time, the second indication that the operator has touched the at least one of the two or more regions of the touch sensitive area comprises receiving, at the second time that is after the first time, a second indication that the operator has touched the one region of the touch sensitive area associated with the first functionality.

* * * * *